US012725391B2

(12) United States Patent
Hara et al.

(10) Patent No.: US 12,725,391 B2
(45) Date of Patent: Sep. 1, 2026

(54) PERFORMANCE RECORDING SYSTEM, PERFORMANCE RECORDING METHOD, AND RECORDING MEDIUM

(71) Applicant: Yamaha Corporation, Hamamatsu (JP)

(72) Inventors: Takahiro Hara, Hamamatsu (JP); Daichi Iseri, Fukuroi (JP); Takahiro Akabane, Hamamatsu (JP); Satoshi Obata, Hamamatsu (JP); Takahiro Yanagawa, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 307 days.

(21) Appl. No.: 18/600,189

(22) Filed: Mar. 8, 2024

(65) Prior Publication Data

US 2024/0212306 A1 Jun. 27, 2024

Related U.S. Application Data

(63) Continuation of application No. PCT/JP2022/032959, filed on Sep. 1, 2022.

(30) Foreign Application Priority Data

Sep. 10, 2021 (JP) ................................ 2021-147641

(51) Int. Cl.
*G06V 10/25* (2022.01)

(52) U.S. Cl.
CPC .......... *G06V 10/25* (2022.01); *G06V 2201/07* (2022.01)

(58) Field of Classification Search
CPC ...... G06V 10/82; G06V 10/764; G06V 10/25; G06V 20/20; G06V 20/70; G06V 2201/03;

(Continued)

(56) References Cited

U.S. PATENT DOCUMENTS

2015/0037008 A1 2/2015 Iwamoto
2020/0097764 A1* 3/2020 de Juan ................ G06V 30/268

FOREIGN PATENT DOCUMENTS

EP 3 467 823 A1 4/2019
JP 2015-031885 A 2/2015

(Continued)

OTHER PUBLICATIONS

J.-C. Lin et al., "Coherent Deep-Net Fusion To Classify Shots In Concert Videos," in IEEE Transactions on Multimedia, vol. 20, No. 11, pp. 3123-3136, Nov. 2018 (Year: 2018).*

(Continued)

*Primary Examiner* — Alex Kok S Liew
(74) *Attorney, Agent, or Firm* — Crowell & Moring LLP

(57) ABSTRACT

A performance recording system includes at least one memory and at least one processor. The at least one processor is configured to determine a plurality of candidate regions in a target capture area of a camera by use of first captured imagery generated by the camera configured to capture a plurality of players in a first playing of a piece of music. The at least one processor is configured to select a target area from among the plurality of candidate regions. The at least one processor is configured to extract, from a performance record, a portion corresponding to the target area, the performance record being obtained by capturing the plurality of players in a second playing of the piece of music or being obtained by receiving sounds produced in the second playing.

20 Claims, 9 Drawing Sheets

(58) Field of Classification Search
CPC ............. G06V 2201/032; G06V 10/26; G06V 2201/07; G06V 30/413; G06V 10/454; G06V 10/56; G06V 10/774; G06V 20/17; G06V 20/47; G06V 20/56; G06V 20/588; G06V 20/64; G06V 2201/031; G06V 40/10; G06V 10/255; G06V 10/40; G06V 10/44; G06V 10/54; G06V 10/70; G06V 10/771; G06V 10/7715; G06V 20/176; G06N 3/09; G06N 3/0464; G06N 3/045; G06N 3/0475; G06N 3/08; G06N 3/044; G06N 3/0442; G06N 3/094; G06N 3/096; G06N 20/10; G06N 3/084; G06N 3/0455; G06N 7/01; G06N 3/047; G06N 20/20
See application file for complete search history.

(56) References Cited

FOREIGN PATENT DOCUMENTS

| | | | |
|---|---|---|---|
| JP | 2019-525571 | A | 9/2019 |
| WO | WO 2017/208820 | A1 | 12/2017 |
| WO | WO 2018/017878 | A1 | 1/2018 |

OTHER PUBLICATIONS

W.-L. Wei, J.-C. Lin, T.-L. Liu, H.-R. Tyan, H.-M. Wang and H.-Y. M. Liao, "Learning to Visualize Music Through Shot Sequence for Automatic Concert Video Mashup," in IEEE Transactions on Multimedia, vol. 23, pp. 1731-1743, Jun. 2020 (Year: 2020).*

International Search Report (PCT/ISA/210) issued in PCT Application No. PCT/JP2022/032959 dated Nov. 8, 2022 (4 pages).

German-language Written Opinion (PCT/ISA/237) issued in PCT Application No. PCT/JP2022/032959 dated Nov. 8, 2022 with English translation (7 pages).

International Search Report (PCT/ISA/210) issued in PCT Application No. PCT/JP2022/032959 dated Nov. 8, 2022 with English translation (4 pages).

Japanese-language Written Opinion (PCT/ISA/237) issued in PCT Application No. PCT/JP2022/032959 dated Nov. 8, 2022 (4 pages).

Japanese-language Office Action issues in Japanese Application No. 2021-147641 dated Jun. 10, 2025 with English translation (11 pages).

English translation of document C2 (Japanese-language Written Opinion (PCT/ISA/237), filed on Mar. 8, 2024) issued in PCT Application No. PCT/JP2022/032959 dated Nov. 8, 2022 (4 pages).

* cited by examiner

JT

| GENRE | W1 | W2 |
| --- | --- | --- |
| POP | W1a | W2a |
| ⋮ | ⋮ | ⋮ |
| JAZZ | W1n | W2n |

PERFORMANCE RECORDING SYSTEM, PERFORMANCE RECORDING METHOD, AND RECORDING MEDIUM

CROSS REFERENCE TO RELATED APPLICATIONS

This application is a Continuation Application of PCT Application No. PCT/JP2022/032959, filed on Sep. 1, 2022, and is based on, and claims priority from, Japanese Patent Application No. 2021-147641, filed on Sep. 10, 2021, the entire contents of which are incorporated herein by reference.

BACKGROUND

The present disclosure relates to a performance recording system, to a performance recording method, and to a recording medium.

Japanese Patent Application Laid-Open Publication No. 2015-31885 discloses a system for creating a piece of music by combining performance content data of each of a plurality of musicians. The performance content data is generated by recording in advance each of the plurality of musicians.

In the system for creating a piece of music disclosed in Japanese Patent Application Laid-Open Publication No. 2015-31885, to create musical content representative of a group of players such as a band, it is necessary to separately generate in advance each of a plurality of pieces of performance content data by recording each of a plurality of players playing a piece of music. This approach is both time and effort intensive.

SUMMARY

An object of one aspect of this disclosure is to provide a technique that reduces an amount of time and effort required to create musical content representative of playing a piece of music by a group of players.

In one aspect, a computer-implemented performance recording method includes: determining a plurality of candidate regions in a target capture area of a camera by use of first captured imagery generated by the camera configured to capture a plurality of players in a first playing of a piece of music; selecting a target area from among the plurality of candidate regions; and extracting, from a performance record, a portion corresponding to the target area, the performance record being obtained by capturing the plurality of players in a second playing of the piece of music or being obtained by receiving sounds produced in the second playing.

In another aspect, a performance recording system includes: at least one memory configured to store instructions; and at least one processor configured to execute the instructions to: determine a plurality of candidate regions in a target capture area of a camera by use of first captured imagery generated by the camera configured to capture a plurality of players in a first playing of a piece of music; select a target area from among the plurality of candidate regions; and extract, from a performance record, a portion corresponding to the target area, the performance record being obtained by capturing the plurality of players in a second playing of the piece of music or being obtained by receiving sounds produced in the second playing.

In yet another aspect, a recording medium is a non-transitory computer-readable recording medium storing instructions executable by at least one processor, which when executed cause the at least one processor to: determine a plurality of candidate regions in a target capture area of a camera by use of first captured imagery generated by the camera configured to capture a plurality of players in a first playing of a piece of music; select a target area from among the plurality of candidate regions; and extract, from a performance record, a portion corresponding to the target area, the performance record being obtained by capturing the plurality of players in a second playing of the piece of music or being obtained by receiving sounds produced in the second playing.

DETAILED DESCRIPTION

Figure 1:
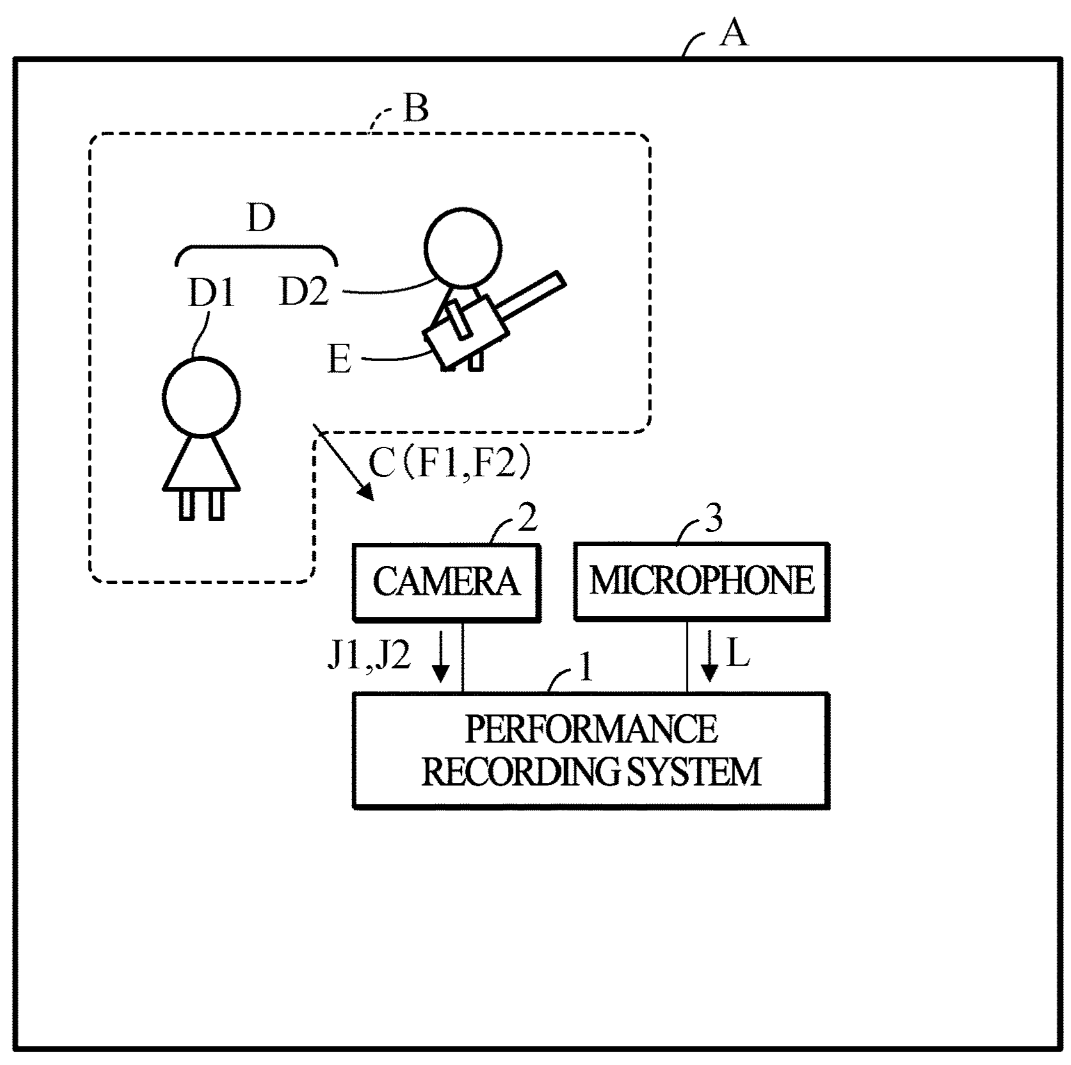
FIG. 1 is a diagram showing a performance recording system 1 according to an embodiment.

FIG. 1 is a diagram showing a performance recording system 1 according to an embodiment. The performance recording system 1 is a computer system for recording a performance group B in playing a piece of music C in a music venue A.

The music venue A is a place in which the performance group B plays the piece of music C. The music venue A is a music studio, a music club, an outdoor stage, or a classroom, for example.

The performance group B is a music band that includes a plurality of players D. The plurality of players D consists of two people, one of whom is a vocalist D1 and the other of whom is an instrumentalist D2. The vocalist D1 and the instrumentalist D2 are each an example of a player D. The vocalist D1 sings the piece of music C. The instrumentalist D2 plays the piece of music C on a musical instrument E. The musical instrument E is, for example, a guitar, but may be another musical instrument such as a bass guitar, a drum kit, an electronic piano, a synthesizer, or other musical instrument. The plurality of players D may include a plurality of vocalists D1. The plurality of players D may include a plurality of instrumentalists D2. The plurality of instrumentalists D2 plays a plurality of musical instruments E. The plurality of musical instruments E may be of the same type or of a different type.

In one instance, the performance group B is in rehearsal playing F1 of the piece of music C in the music venue A. In another instance, the performance group B is in presentation playing F2 of the piece of music C in the music venue A. The rehearsal playing F1 is an example of a first playing. The presentation playing F2 is an example of a second playing.

The performance recording system 1 is connected to a camera 2 and a microphone 3. The performance recording system 1 may include the camera 2 or the microphone 3, or may include both the camera 2 and the microphone 3. The camera 2 and the microphone 3 are disposed centrally within the music venue A, or are disposed non-centrally within the music venue A. The camera 2 and the microphone 3 are used by the performance recording system 1 to record the performance group B playing the piece of music C in the music venue A.

The camera 2 is a 360-degree camera, and may be referred to as an omnidirectional camera.

Figure 2:
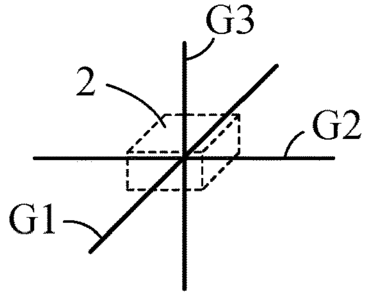
FIG. 2 is a diagram showing three axes set virtually for a camera 2.

FIG. 2 is a diagram showing three axes set virtually for the camera 2. The three axes are a roll-axis G1, a pitch-axis G2, and a yaw-axis G3. The roll-axis G1 is parallel to a longitudinal direction of the camera 2. The pitch-axis G2 is parallel to a lateral direction of the camera 2. The yaw-axis G3 is parallel to a vertical axis of the camera 2. The roll-axis G1, the pitch-axis G2, and the yaw-axis G3 are perpendicular to each other.

Figure 3:
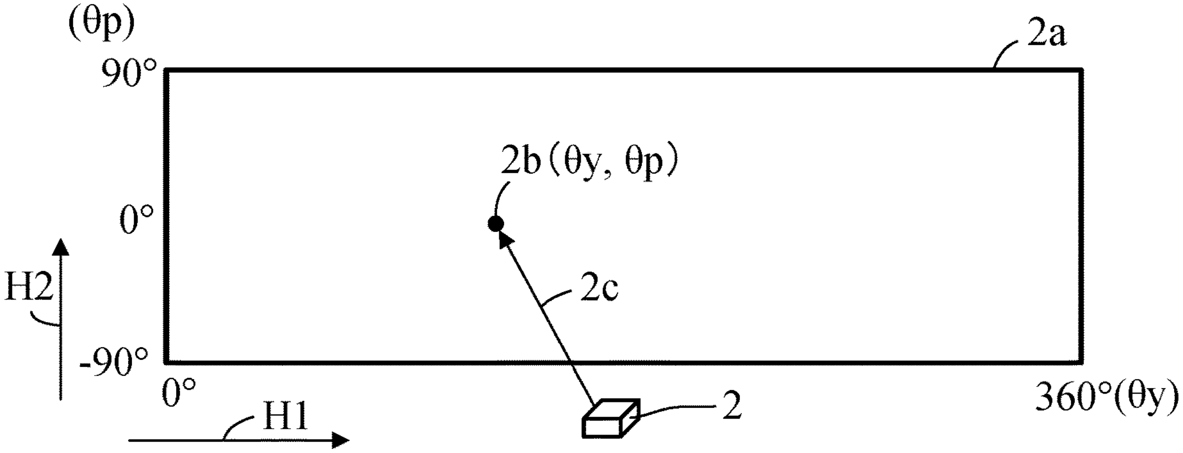
FIG. 3 is a diagram showing a target capture area 2*a* of the camera 2, the target capture area 2*a* being developed in a plane.

FIG. 3 is a diagram showing a target capture area 2*a* of the camera 2. The target capture area 2*a* of the camera 2 is a field of view that includes an entire peripheral area of the camera 2. In FIG. 3, the target capture area 2*a* is developed in a plane. The target capture area 2*a* developed in the plane includes a lateral direction H1. In the lateral direction H1, a rotation angle θy is set for the target capture area 2*a* developed in the plane. The rotation angle θy is an angle of rotation around the yaw-axis G3. The yaw-axis G3 is a rotational axis. The rotation angle θy is within a range of 0° to 360°. In addition, the target capture area 2*a* developed in the plane includes a longitudinal direction H2. In the longitudinal direction H2, a rotation angle θp is set for the target capture area 2*a* developed in the plane. The rotation angle θp is an angle of rotation around the pitch-axis G2. The pitch-axis G2 is a rotational axis. The rotation angle θp is within a range of −90° to 90°.

The target capture area 2*a* includes a freely selected point 2*b*. The position of the freely selected point 2*b* is defined by a combination of the rotation angle θy and the rotation angle θp. In addition, a direction 2*c* from the camera 2 toward the point 2*b* is defined by a combination of the rotation angle θy and the rotation angle θp. The direction 2*c* is referred to as a camera angle.

The camera 2 captures the performance group B in the rehearsal playing F1 of the piece of music C in the music venue A, and generates rehearsal video data as a series of image data J1. The series of image data J1 indicates captured still images in video frames. A still image indicated by the image data J1 is referred to as a "captured image K1." The camera 2 that generates the image data J1 is the same as the camera 2 that generates the captured image K1. The captured image K1 is an example of first captured imagery.

The camera 2 captures the performance group B in the presentation playing F2 of the piece of music C in the music venue A, and generates presentation video data as a series image data J2. The series of image data J2 indicates captured still images in video frames. A still image indicated by the image data J2 is referred to as a "captured image K2." The camera 2 that generates the image data J2 is the same as the camera 2 that generates the captured image K2. The captured image K2 is an example of second captured imagery, and is also an example of a performance record.

Figure 4:
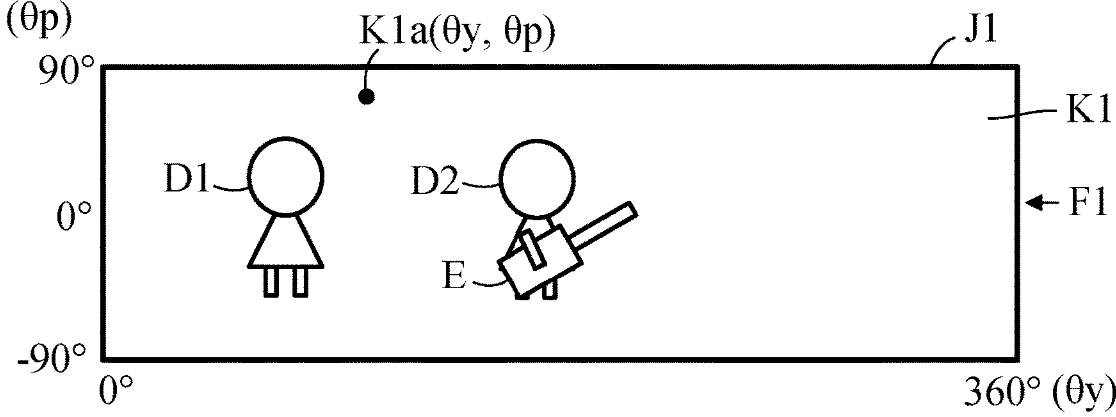
FIG. 4 is a diagram showing a captured image K1 developed in a plane.

FIG. 4 is a diagram showing the captured image K1 developed in a plane. The captured image K1 is an omnidirectional image of the performance group B in the rehearsal playing F1 of the piece of music C. The omnidirectional image may be referred to as a spherical image, a spherical panoramic image, or a 360-degree image, for example. The captured image K1 is developed in a plane by the performance recording system 1 or by the camera 2. In the following, an example will be described in which the captured image K1 is developed in a plane by the camera 2. The camera 2 generates the image data J1 indicative of the captured image K1 developed in a plane.

The captured image K1 represents the vocalist D1, the instrumentalist D2, and the musical instrument E. The position of a freely selected point K1*a* of the captured image K1 is defined by a combination of a rotation angle θy and a rotation angle θp.

Figure 5:
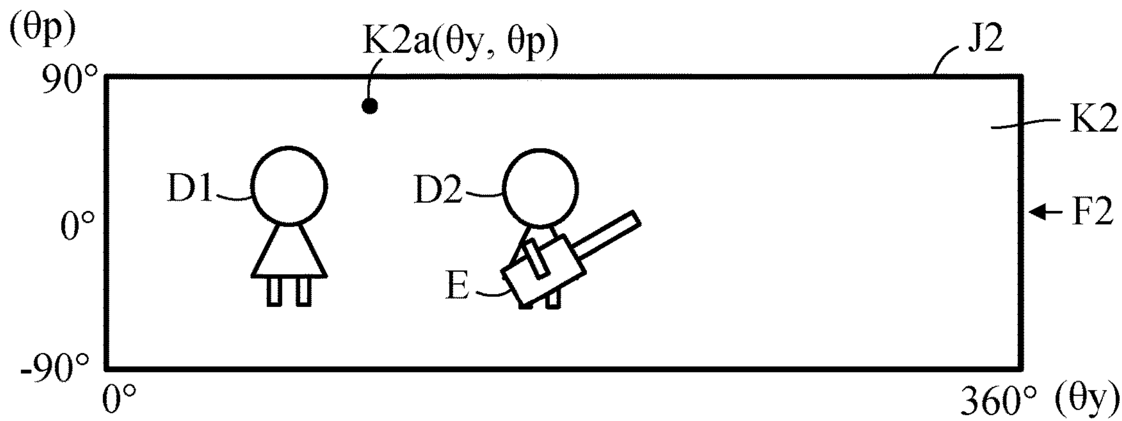
FIG. 5 is a diagram showing a captured image K2 developed in a plane.

FIG. 5 is a diagram showing the captured image K2 developed in a plane. The captured image K2 is an omnidirectional image of the performance group B in the presentation playing F2 of the piece of music C. The captured image K2 is developed in a plane by the performance recording system 1 or by the camera 2. In the following, an example will be described in which the captured image K2 is developed in a plane by the camera 2. The camera 2 generates the image data J2 indicative of the captured image K2 developed in a plane.

The captured image K2 represents the vocalist D1, the instrumentalist D2, and the musical instrument E. The position of a freely selected point K2*a* of the captured image K2 is defined by a combination of a rotation angle θy and a rotation angle θp. The position (coordinates) of a freely selected point of the captured image K1 and the position (coordinates) of a freely selected point of the captured image K2 may each be defined by coordinates x and y on each captured image developed in a plane, instead of a combination of a rotation angle θy and a rotation angle θp. The coordinates x and y on the captured image K1 or K2 developed in a plane are denoted by a combination of a coordinate x on an x-axis parallel to a lateral direction (horizontal direction) of the captured image developed in a plane, and a coordinate y on a y-axis parallel to a longitudinal direction (vertical direction) of the captured image developed in a plane.

In a state in which it is not necessary to distinguish between the captured image K1 and the captured image K2, the captured image K1 and the captured image K2 may each be referred to as a "captured image K." Likewise, in a state in which it is not necessary to distinguish between the image data J1 and the image data J2, the image data J1 and the image data J2 may each be referred to as "image data J."

In FIG. 1, the microphone 3 is a set of microphones that includes a plurality of microphones. Each of the plurality of microphones is directional. However, the microphone 3 may be a single non-directional microphone. The microphone 3 has a sound receiving area from which it receives sounds. The sound receiving area of the microphone 3 includes the entire circumferential area of the microphone 3. However, as long as the sound receiving area of the microphone 3 covers the target capture area 2*a* of the camera 2, the sound receiving area of the microphone 3 need not necessarily include the entire circumferential area of the microphone 3.

The microphone 3 receives sounds produced by the performance group B in playing of the piece of music C in the music venue A. For example, the microphone 3 receives sounds produced by the performance group B in the rehearsal playing F1 of the piece of music C in the music venue A. In addition, the microphone 3 receives sounds produced by the performance group B in the presentation playing F2 of the piece of music C in the music venue A.

The microphone 3 generates audio data L. The audio data L is data indicative of audio received by the microphone 3 in receiving sounds produced by the performance group B in the presentation playing F2 of the piece of music C. The audio indicated by the audio data L is an example of the performance record.

The performance recording system 1 is a smartphone, for example. However, the performance recording system 1 is not limited to a smartphone, and may be a personal computer or a tablet. The smartphone and the tablet are each an example of a portable information device. The personal computer is an example of a portable or stationary information device. The performance recording system 1 may be constituted of a single integrated device, or may be constituted of a plurality of separate devices.

The performance recording system 1 acquires the image data J1 and the image data J2.

The performance recording system 1 determines a plurality of candidate regions 2*d* in the target capture area 2*a* by use of the captured image K1 indicated by the image data J1. For example, the performance recording system 1 determines, based on a target M represented in the captured image K1, the plurality of candidate regions 2*d* in the target capture area 2*a*.

The target M includes the musical instrument E and at least a portion of a body of a player of the plurality of players D, for example. The included portion is the upper body of the player, for example. However, the included portion is not limited to the upper body of the player, and may be a hand of the player, a face of the player, or a whole body of the player.

Figure 6:
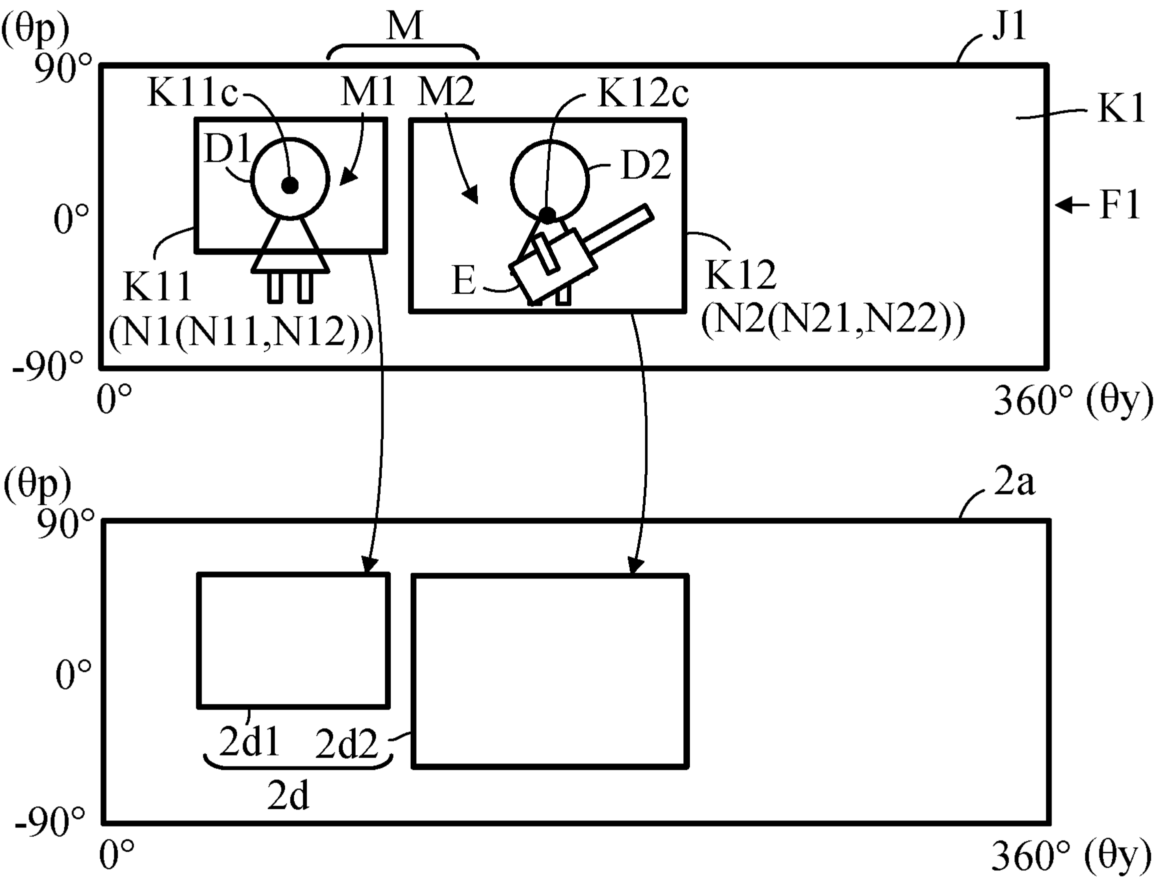
FIG. 6 is a diagram showing an example of a plurality of targets M, and an example of a plurality of candidate regions 2*d;*

FIG. 6 is a diagram showing both an example of the target M represented in the captured image K1 representative of the performance group B in the rehearsal playing F1 of the piece of music C, and an example of the plurality of candidate regions 2*d* in the target capture area 2*a*.

The target M includes a detection target M1 and a detection target M2. The detection target M1 is the upper body of the vocalist D1. The detection target M2 includes the whole body of the instrumentalist D2 and also the musical instrument E. The detection target M2 may be referred to as a combination of the whole body of the instrumentalist D2 and the musical instrument E.

The performance recording system 1 sets an image area K11 and an image area K12 in the captured image K1 representative of the performance group B in the rehearsal playing F1 of the piece of music C. The image area K11 and the image area K12 are included in an example of a plurality of image areas. The image area K11 is a portion of the captured image K1 in which the detection target M1 is represented. The image area K12 is a portion of the captured image K1 in which the detection target M2 is represented.

The performance recording system 1 automatically sets the image area K11 and the image area K12 by use of an image recognition technique, for example.

The image area K11 and the image area K12 are each rectangular. The image area K11 and the image area K12 each have the same aspect ratio AP. However, the image area K11 and the image area K12 may each have different aspect ratios.

The performance recording system 1 generates image area data N1 indicative of the image area K11. The image area K11 is an area in which the upper body of the vocalist D1 is represented when the performance group B is in the rehearsal playing F1 of the piece of music C. The image area data N1 includes position data N11 and size data N12. The position data N11 indicates a combination of a rotation angle θy and a rotation angle θp. The combination of the rotation angle θy and the rotation angle θp defines a central position K11*c* of the image area K11. The central position K11*c* of the image area K11 is a position of a point at which two diagonal lines of the image area K11 intersect, for example. The size data N12 indicates a size of the image area K11. The size data N12 indicates a ratio of the size of the image area K11 to a size of a reference rectangular area having the aspect ratio AP. The reference rectangular image is set in advance. The size data N12 may be referred to as zoom data.

The performance recording system 1 generates image area data N2 indicative of the image area K12. The image area K12 is an area in which the whole body of the instrumentalist D2 and also the musical instrument E are represented when the performance group B is in the rehearsal playing F1 of the piece of music C. The image area data N2 includes position data N21 and size data N22. The position data N21 indicates a combination of a rotation angle θy and a rotation angle θp. The combination of the rotation angle θy and the rotation angle θp defines a central position K12*c* of the image area K12. The central position K12*c* of the image area K12 is a position of a point at which two diagonal lines of the image area K12 intersect, for example. The size data N22 indicates a size of the image area K12. The size data N22 indicates a ratio of the size of the image area K12 to a size of the reference rectangular area. The size data N22 may be referred to as zoom data.

The plurality of candidate regions 2*d* in the target capture area 2*a* includes a candidate region 2*d*1 and a candidate region 2*d*2. The candidate region 2*d*1 corresponds to the image area K11 in which the upper body of the vocalist D1 is represented when the performance group B is in the rehearsal playing F1 of the piece of music C. The candidate region 2*d*2 corresponds to the image area K12 in which the whole body of the instrumentalist D2 and the musical instrument E are represented when the performance group B is in the rehearsal playing F1 of the piece of music C.

The performance recording system 1 determines the candidate 2*d*1 region and the candidate region 2*d*2 by use of the image area data N1, which is indicative of the image area K11, and the image area data N2, which is indicative of the image area K12. For example, the performance recording system 1 determines, as the candidate region 2*d*1, an area in the target capture area 2*a* of the camera 2, the area having a position and a size indicated by the image area data N1. The performance recording system 1 determines, as the candidate region 2*d*2, an area in the target capture area 2*a* of the camera 2, the area having a position and a size indicated by the image area data N2.

Figure 7:
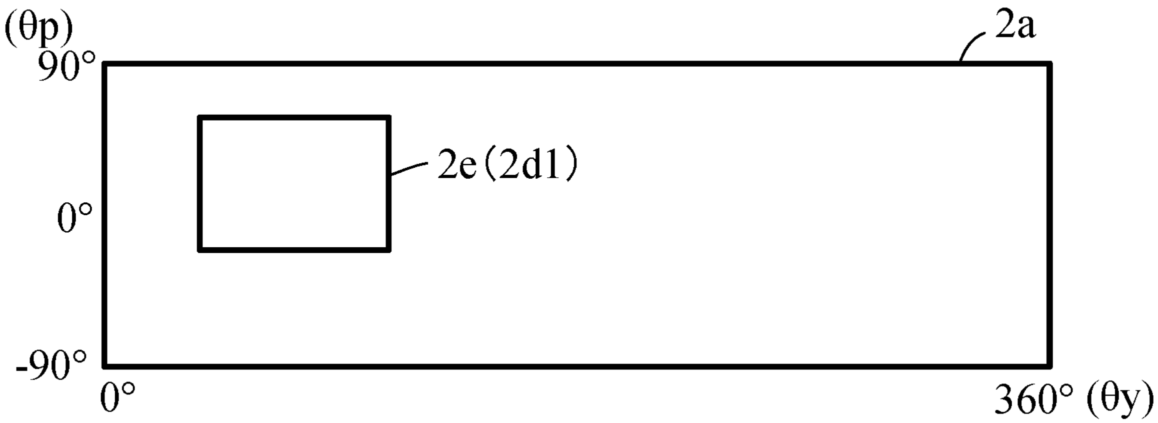
FIG. 7 is a diagram showing a candidate region 2*d*1 that is selected as a target area 2*e;*

The performance recording system 1 selects a target area 2*e* from among the plurality of candidate regions 2*d*. FIG. 7 is a diagram showing an example of the candidate region 2*d*1 selected as the target area 2*e* from the candidate regions 2*d*1 and 2*d*2. Alternatively, the candidate region 2*d*2 may be selected as the target area 2*e*.

The performance recording system 1 extracts, from the captured image K2 representative of the performance group B in the presentation playing F2 of the piece of music C, an output image P represented in the target area 2*e* in the captured image K2. The image represented in the target area 2*e* in the captured image K2 is an image of at least one object represented in the target area 2*e* in the captured image K2. The target area 2*e* in the captured image K2 has a position and a size indicated by image area data that corresponds to the target area 2*e*.

Figure 8:
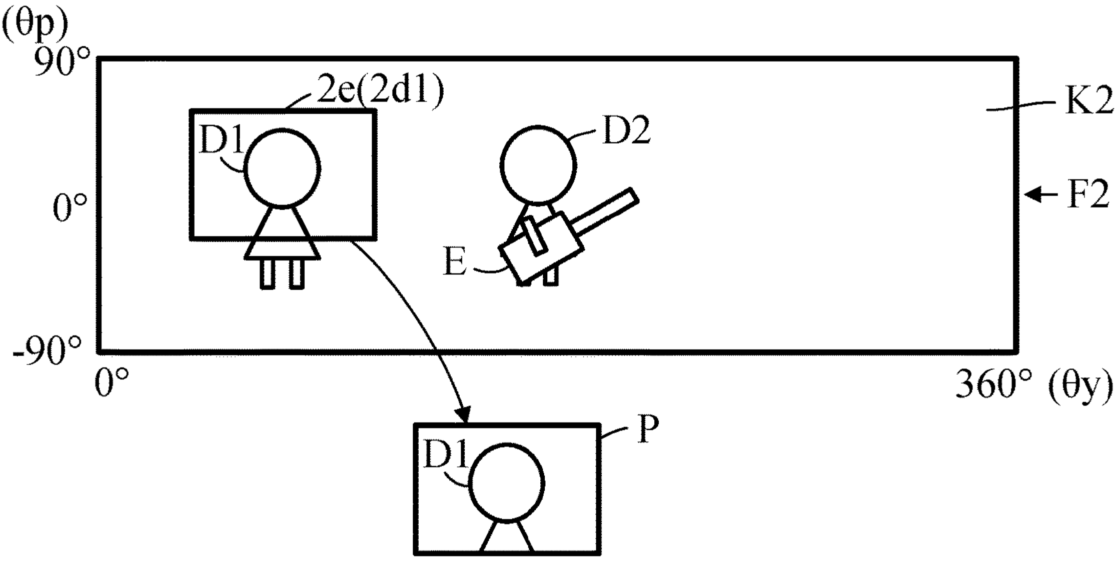
FIG. 8 is a diagram showing an example of an output image P.

FIG. 8 is a diagram showing an example of the output image P. The output image P is an image extracted from the captured image K2 in a state in which the candidate region 2*d*1 is selected as the target area 2*e*.

Figure 9:
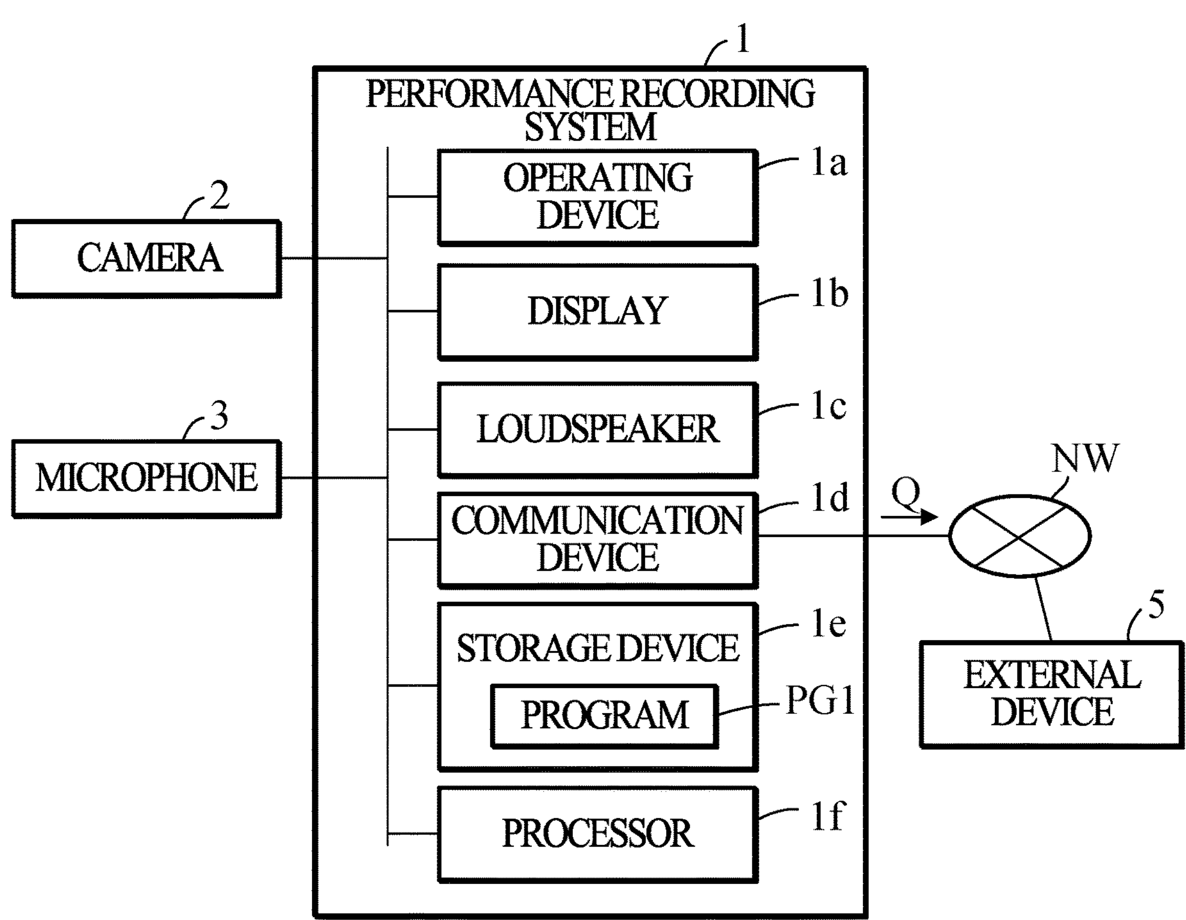
FIG. 9 is a diagram showing an example of the performance recording system 1.

FIG. 9 is a diagram showing an example of the performance recording system 1. The performance recording system 1 includes an operating device 1*a*, a display 1*b*, a loudspeaker 1*c*, a communication device 1*d*, a storage device 1*e*, and a processor 1*f*.

The operating device 1*a* is an input device configured to receive instructions from a user. The operating device 1*a* is, for example, a touch panel, but is not limited to a touch panel. The operating device 1*a* may be an input device (for example, a mouse or a keyboard) connected to the performance recording system 1 either by wire or wirelessly, and may be external to and separate from the performance recording system 1.

The display 1*b* is a display panel. The display panel is a liquid crystal display panel or an organic Electroluminescence (EL) panel, for example. The display 1*b* may be a touch panel, and the touch panel may be used as the display 1*b* and also as the operating device 1*a*. The display 1*b* is connected to the performance recording system 1 either by wire or wirelessly, and may be external to and separate from the performance recording system 1. The display 1*b* displays various images.

The loudspeaker 1*c* may be constituted of a plurality of loudspeakers or of a single loudspeaker. The loudspeaker 1*c* is connected to the performance recording system 1 either by wire or wirelessly, and may be external to and separate from the performance recording system 1. The loudspeaker 1*c* emits various sounds.

The communication device 1*d* communicates with an external device 5 via a communication network NW. For example, the communication device 1*d* transmits playing data Q, which is indicative of the performance group B in the presentation playing F2 of the piece of music C, to the external device 5 via the communication network NW. The external device 5 is a delivery server or a terminal device, for example. The delivery server is a server that delivers the playing data Q received from the performance recording system 1. The terminal device is a smartphone, a tablet, or a personal computer, for example.

The storage device 1*e* is a recording medium readable by a computer (for example, a non-transitory recording medium readable by a computer). The storage device 1*e* includes one or more memories. The storage device 1*e* includes a nonvolatile memory and a volatile memory, for example. The nonvolatile memory includes a read only memory (ROM), an erasable programmable read only memory (EPROM), and an electrically erasable programmable read only memory (EEPROM), for example. The volatile memory includes a random access memory (RAM), for example.

The storage device 1*e* stores a program PG1, which includes instructions, and various kinds of data. The program PG1 defines an operation of the performance recording system 1. The storage device 1*e* may store the program PG1 that has been read from a storage device in a server communicable with the processor 1*f*. In this case, the storage device in the server is an example of a recording medium readable by a computer. The storage device 1*e* may be a portable recording medium detachable from the performance recording system 1. The storage device 1*e* may be external to and separate from the performance recording system 1.

The processor 1*f* includes one or more central processing units (CPUs). The one or more CPUs are examples of one or more processors. The processor and the CPU are each an example of a computer.

The processor 1*f* reads the program PG1 from the storage device 1*e*. The processor 1*f* executes the program PG1.

Figure 10:
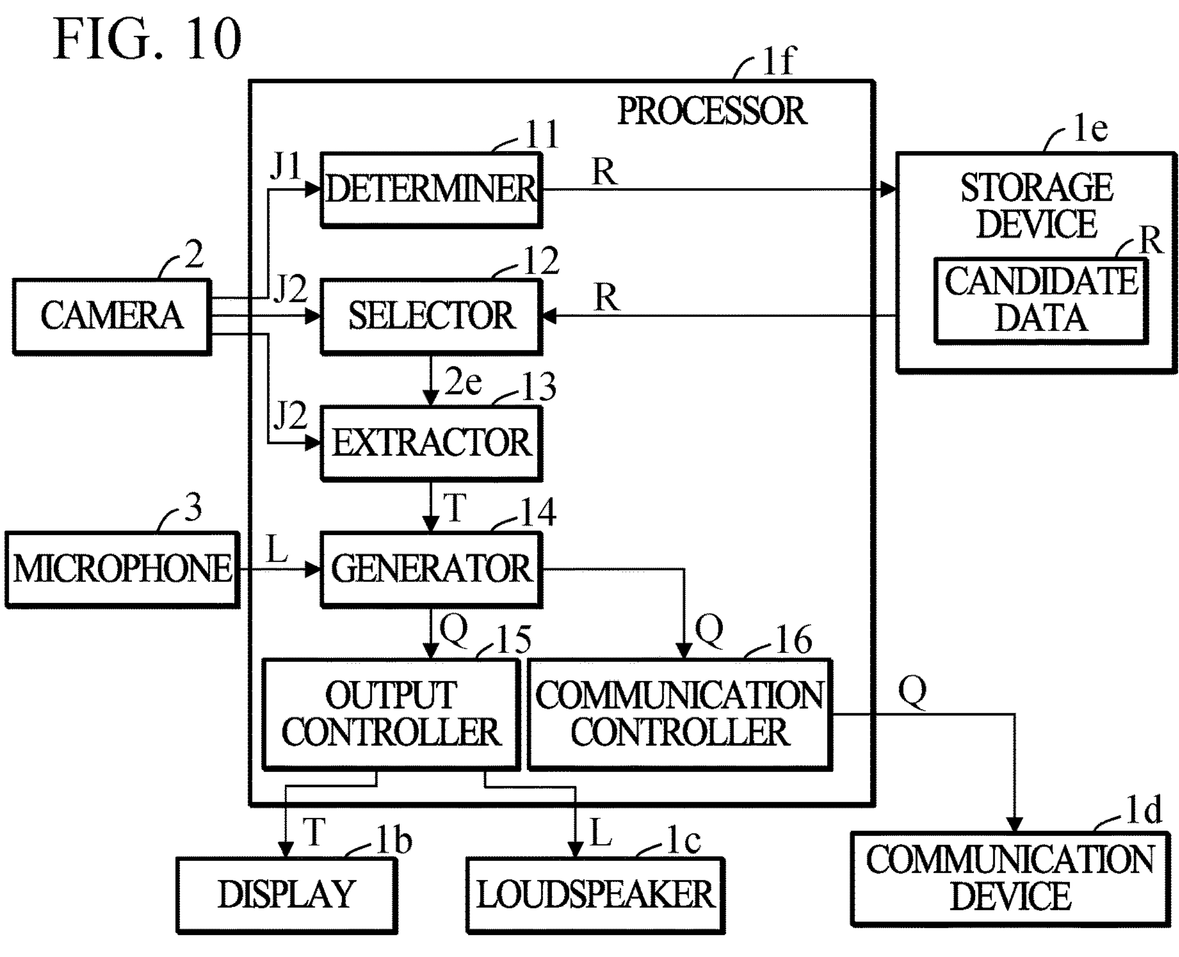
FIG. 10 is a diagram showing an example of a processor 1*f;*

FIG. 10 is a diagram showing an example of the processor 1*f*. The processor 1*f* executes the program PG1 to function as a determiner 11, a selector 12, an extractor 13, a generator 14, an output controller 15, and a communication controller 16. At least one of the determiner 11, the selector 12, the extractor 13, the generator 14, the output controller 15, and the communication controller 16 may be configured as circuitry such as a digital signal processor (DSP) and an application specific integrated circuit (ASIC).

The determiner 11 determines the plurality of candidate regions 2*d* in the target capture area 2*a* of the camera 2 by use of the captured image K1 representative of the performance group B in the rehearsal playing F1 of the piece of music C. The determiner 11 generates candidate data R indicative of the plurality of candidate regions 2*d*. The determiner 11 stores the candidate data R in the storage device 1*e*.

The determiner 11 may generate, as the candidate data R, data that is indicative of the plurality of candidate regions 2*d*, and also of the type of musical instrument represented in the image areas (for example, the image areas K11 and K12 shown in FIG. 6) in the captured image K1. The type of musical instrument is input by the user via the operating device 1*a*. Alternatively, the type of musical instrument is identified by the determiner 11 via image recognition processing performed on the captured image K1. The determiner 11 may generate, as the candidate data R, data indicative of the plurality of candidate regions 2*d* and the type of musical instrument, and also of a name of the performance group B and an explanation of the piece of music C. In this case, it is possible to readily identify the candidate data R. In addition, the candidate data R can also be used as data indicative of a name of the performance group B, and as data indicative of an explanation of the piece of music C. In a case that two or more different captured images K1 are generated, the determiner 11 may determine the plurality of candidate regions 2*d* for each of the two or more different captured images K1. The two or more different captured images K1 can be specified by the user. The determiner 11 generates the candidate data R for each of the two or more different captured images K1. For example, assuming that each of the two or more different captured images K1 is referred as a captured image K1*n*, the determiner 11 generates, as the candidate data R, data indicative of both a plurality of candidate regions 2*d* dependent on the captured image K1*n*, and an elapsed rehearsal time from a point of time of starting the rehearsal playing F1 to a point of time of generating the captured image K1*n*.

The selector 12 selects the target area 2*e* from among the plurality of candidate regions 2*d*. The selector 12 reads the candidate data R from the storage device 1*e*. The selector 12 selects the target area 2*e* from the plurality of candidate regions 2*d* indicated by the candidate data R. For example, the selector 12 selects the target area 2*e* by analyzing the captured image K2 representative of the performance group B in the presentation playing F2 of the piece of music C. The selector 12 may change the candidate data R to other of candidate data R in the course of the presentation playing F2 of the piece of music C. For example, the selector 12 specifies, as provisional candidate data Ra, candidate data R, the candidate data R indicating an elapsed rehearsal time that is less than an elapsed time from a point of time of starting the presentation playing F2. The selector 12 specifies, as target candidate data Rb, provisional candidate data Ra that indicates an elapsed rehearsal time having a smallest difference from the elapsed time from the point of time of starting the presentation playing F2. When no provisional candidate data Ra is present, the selector 12 specifies, as the target candidate data Rb, candidate data R that indicates an elapsed rehearsal time having a smallest difference from the elapsed time from the point of time of starting the presentation playing F2. The selector 12 then selects the target area 2*e* from among the plurality of candidate regions 2*d* indicated by the target candidate data Rb by analyzing a captured image K2, the captured image K2 being representative of the performance group B in the presentation playing F2 of the piece of music C at a point of time at which the elapsed time has elapsed since the point of time of starting the presentation playing F2. The selector 12 may select the target area 2*e* upon receipt of an instruction from the user. The selector 12 may select the target area 2*e* at random. When the selector 12 selects the target area 2*e* at random, it is possible to omit the captured image K2 (image data J2), which is representative of the performance group B in the presentation playing F2 of the piece of music C, to select the target area 2*e*.

The extractor 13 extracts, from the captured image K2 representative of the performance group B in the presentation playing F2 of the piece of music C, the output image P, which is the image represented in the target area 2*e* in the captured image K2.

For example, the extractor 13 extracts the output image P from the captured image K2 at a point of time dependent on a point of time of selecting the target area 2*e*. The extractor 13 may extract the output image P from the captured image K2 at a point of time in response to the selecting of the target area 2*e*. In this case, the point of time in response to the selecting of the target area 2*e* is an example of the point of time dependent on the point of time of selecting the target area 2*e*. When the captured image K2 is supplied to the extractor 13 after the captured image K2 is supplied to the selector 12, the extractor 13 may extract the output image P from the captured image K2 at a point of time at which a predetermined time has elapsed since the target area 2*e* was selected. In this case, the point of time at which the predetermined time has elapsed since the target area 2*e* was selected is an example of the point of time dependent on the point of time of selecting the target area 2*e*. The selecting of the target area 2*e* is sequentially executed with progression (elapsed time) of the presentation playing F2 of the piece of music C. Thus, the point of time dependent on the point of time of selecting the target area 2*e* may be referred to as a point of time dependent on progression (elapsed time) of the presentation playing F2 of the piece of music C. In a state in which the target area 2*e* changes with progression of the presentation playing F2 of the piece of music C, the output image P extracted by the extractor 13 from the captured image K2 is changed. In a state in which the plurality of candidate regions 2*d* changes with the progression (elapsed time) of the presentation playing F2 of the piece of music C, the output image P extracted by the extractor 13 from the captured image K2 may be changed. Thus, the extractor 13 can extract a variety of output images P that change with the progression of the presentation playing F2 of the piece of music C. The extractor 13 generates output image data T indicative of the output image P.

The generator 14 receives the output image data T and the audio data L. The output image data T is image data indicative of the output image P extracted from the captured image K2 representative of the performance group B in the presentation playing F2 of the piece of music C. The audio data L is audio data generated by the microphone 3 upon receiving sounds produced by the performance group B in the presentation playing F2 of the piece of music C. The generator 14 generates the playing data Q that includes both the output image data T and the audio data L. The playing data Q is data indicative of an image of the performance group B in the presentation playing F2 of the piece of music C, and of audio produced by the performance group B in the presentation playing F2 of the piece of music C.

The output controller 15 provides the display 1*b* with the output image data T included in the playing data Q to cause the display 1*b* to display the output image P indicated by the output image data T. The output controller 15 provides the loudspeaker 1*c* with the audio data L included in the playing data Q to cause the loudspeaker 1*c* to emit sounds based on the audio data L.

The communication controller 16 transmits the playing data Q from the communication device 1*d* to the external device 5 via the communication network NW.

Figure 11:
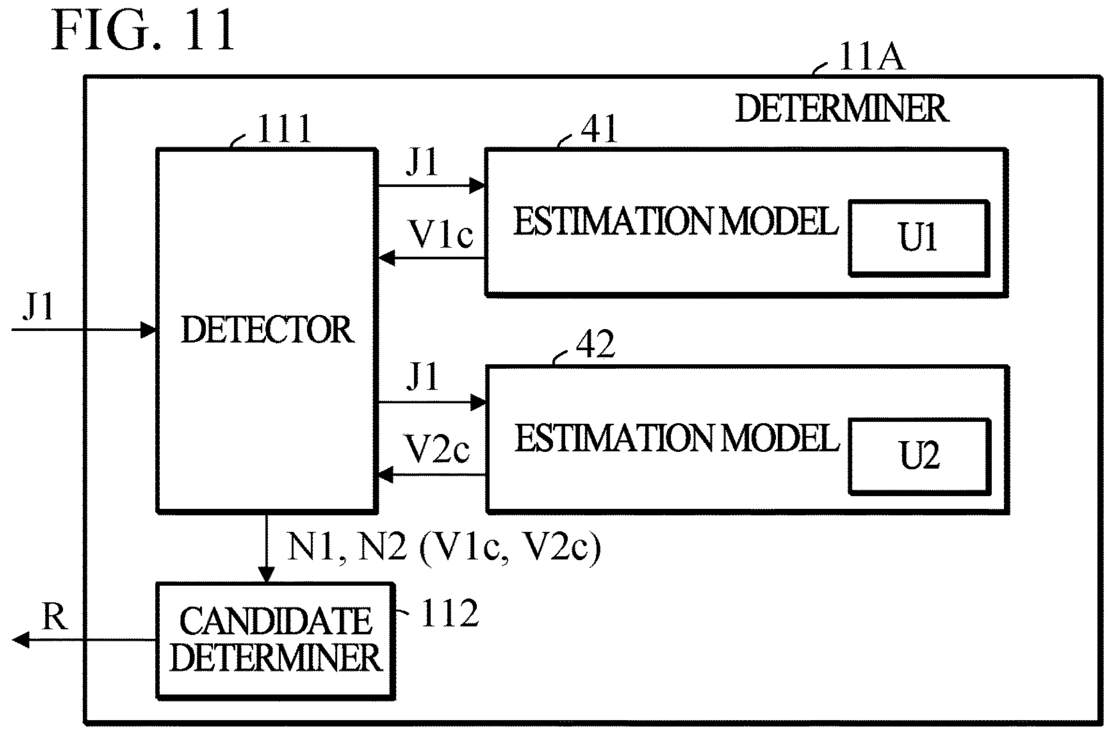
FIG. 11 is a diagram showing a determiner 11A as an example of a determiner 11.

FIG. 11 is a diagram showing a determiner 11A as an example of the determiner 11. The determiner 11A includes a detector 111, a candidate determiner 112, an estimation model 41, and an estimation model 42. The estimation model 41 and the estimation model 42 may each be external to and separate from the determiner 11A.

The detector 111 detects the target M, which comprises the musical instrument E and at least the portion of the body of the player of the plurality of players D, from the captured image K1 representative of the performance group B in the rehearsal playing F1 of the piece of music C. For example, the detector 111 detects the detection target M1, which is the upper body of the vocalist D1, and the detection target M2, which includes the whole body of the instrumentalist D2 and the musical instrument E (for example, a guitar), from the captured image K1.

The detector 111 uses the estimation model 41 to detect the detection target M1. The estimation model 41 is a trained model that is trained by machine learning to learn a relationship between the image data J (the captured image K) and an area in which the detection target M1 is represented. The estimation model 41 is constituted of a deep neural network (DNN). The deep neural network may be a convolutional neural network (CNN), a recurrent neural network (RNN), or a neural network having long short-term memory (LSTM). The estimation model 41 may include a combination of different deep neural networks.

The estimation model 41 has multiple coefficients U1. The multiple coefficients U1 define an operation of the estimation model 41. The multiple coefficients U1 are set in advance by machine learning.

Figure 12:
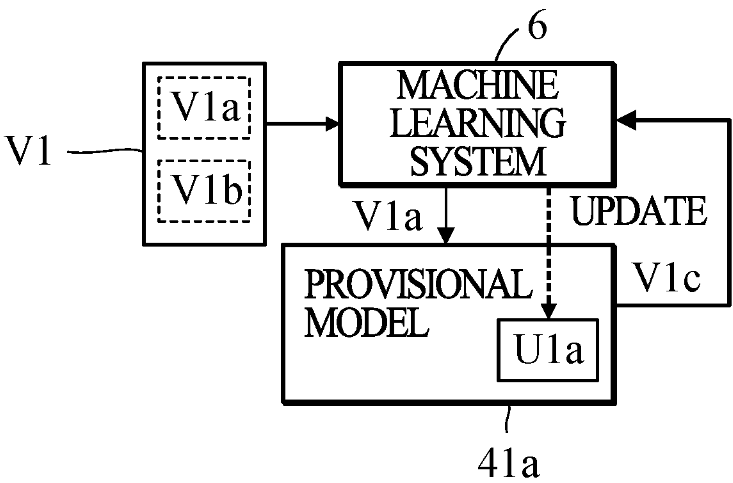
FIG. 12 is an explanatory diagram showing an example of machine learning.

FIG. 12 is a diagram explaining an example of machine learning. In FIG. 12, a machine learning system 6 is a system that is separate from the performance recording system 1. The machine learning system 6 is a server system communicable with the performance recording system 1 via the communication network NW, for example. The machine learning system 6 adjusts a provisional model 41*a* to complete the estimation model 41. The provisional model 41*a* is an estimation model (deep neural network) that has multiple coefficients U1*a*. The machine learning system 6 updates the multiple coefficients U1*a* through machine learning to complete the multiple coefficients U1 and the estimation model 41. The multiple coefficients U1 are the multiple coefficients U1*a* for which updating has been completed. The estimation model 41 is the provisional model 41*a* having the multiple coefficients U1*a* for which updating has been completed.

The machine learning system 6 uses training data V1 to update the multiple coefficients U1*a*. The training data V1 includes a pair of image data V1*a* and area data V1*b*.

The image data V1*a* indicates a known image including an image of the detection target M1. The image data V1*a* is generated by the camera 2. Alternatively, the image data V1*a* may be generated by a 360-degree camera that is separate from the camera 2. The image data V1*a* may be generated by a known image composition technique.

The area data V1*b* indicates an area in which the detection target M1 in an image is represented, the image being indicated by the image data V1*a* paired with the area data V1*b*. The area data V1*b* indicates, as the area in which the detection target M1 is represented, a rectangular area in which the detection target M1 is represented. The rectangular area in which the detection target M1 is represented has the aspect ratio AP. In other words, the aspect ratio of the rectangular area indicated by the area data V1*b* is the same as the aspect ratio of each of the plurality of candidate regions 2*d*.

The area data V1*b* includes position data V1*b*1 and size data V1*b*2. The position data V1*b*1 indicates a combination of a rotation angle θy and a rotation angle θp. The combination of the rotation angle θy and the rotation angle θp indicated by the position data V1*b*1 defines a central position of the rectangular area in which the detection target M1 is represented. The central position of the rectangular area in which the detection target M1 is represented is a position of a point at which two diagonal lines of the rectangular area in which the detection target M1 is represented intersect, for example. The size data V1*b*2 indicates the size of the rectangular area in which the detection target M1 is represented. The size data V1*b*2 indicates a ratio of the size of the rectangular area in which the detection target M1 is represented to the size of the reference rectangular area. The size data V1*b*2 may be referred to as zoom data.

The area data V1*b* indicates a correct response to be output from the provisional model 41*a* when the image data V1*a* is input to the provisional model 41*a*.

When the machine learning system 6 inputs the image data V1*a* to the provisional model 41*a*, the provisional model 41*a* outputs area data V1*c*. The area data V1*c* indicates a rectangular area in which the detection target M1 in an image is estimated to be represented, the image being indicated by the input image data V1*a*.

The area data V1*c* includes position data V1*c*1 and size data V1*c*2. The position data V1*c*1 indicates a combination of a rotation angle θy and a rotation angle θp. The combination of the rotation angle θy and the rotation angle θp indicated by the position data V1*c*1 defines a central position of the rectangular area in which the detection target M1 is estimated to be represented. The central position of the rectangular area in which the detection target M1 is estimated to be represented is a position of a point at which two diagonal lines of the rectangular area in which the detection target M1 is estimated to be represented intersect, for example. The size data V1*c*2 indicates the size of the rectangular area in which the detection target M1 is estimated to be represented. The size data V1*c*2 indicates a ratio of the size of the rectangular area in which the detection target M1 is estimated to be represented to the size of the reference rectangular area. The size data V1*c*2 may be referred to as zoom data.

The machine learning system 6 uses the training data V1 and the provisional model 41*a* to compute an error function. The error function represents an error between the area data V1*c*, which is output from the provisional model 41*a* when the machine learning system 6 inputs the image data V1*a* to the provisional model 41*a*, and the area data V1*b* paired with the image data V1*a*. The machine learning system 6 updates the multiple coefficients U1*a* to decrease the error represented by the error function. The machine learning system 6 determines, as the estimation model 41, the provisional model 41*a* at a point of time of completion of updating the multiple coefficients U1*a* by use of the training data V1.

The estimation model 41 outputs statistically reasonable area data V1*c* for unknown image data V1*a* based on a relationship between the image data V1*a* and the area data V1*b* in the training data V1. The estimation model 41 is a trained model that is trained to learn the relationship between the image data V1*a* and the area data V1*b*. When the image data J1 is input as unknown image data V1*a*, the estimation model 41 can determine a rectangular area, in which the detection target M1 is represented, in the image (the captured image K1) indicated by the image data J1 with high accuracy.

In FIG. 11, the detector 111 inputs the image data J1, which is indicative of the performance group B in the rehearsal playing F1 of the piece of music C, to the estimation model 41. The detector 111 acquires, as the image area data N1 indicative of the image area K11, the area data V1*c* output from the estimation model 41 in response to input of the image data J1 to the estimation model 41. As shown in FIG. 6, the image area K11 is a rectangular area in which the detection target M1 is represented. Thus, the detector 111 acquires the image area data N1 from the estimation model 41 to detect the detection target M1.

The detector 111 uses the estimation model 42 to detect the detection target M2. The estimation model 42 is a trained model that is trained by machine learning to learn a relationship between the image data J (the captured image K) and an area in which the detection target M2 is represented. The estimation model 42 is constituted of a deep neural network. The estimation model 42 may include a combination of different deep neural networks.

The estimation model 42 has multiple coefficients U2. The multiple coefficients U2 define an operation of the estimation model 42, and are set in advance by machine learning.

The estimation model 42 is completed similarly to the estimation model 41. To complete the estimation model 42, training data V2 is used instead of the training data V1.

Figure 13:
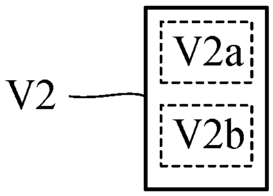
FIG. 13 is a diagram showing an example of training data V2.

FIG. 13 is a diagram showing an example of the training data V2 with a pair of image data V2*a* and area data V2*b*.

The image data V2*a* indicates a known image including an image of the detection target M2. The image data V2*a* is generated by the camera 2. Alternatively, the image data V2*a* may be generated by a 360-degree camera that is separate from the camera 2. The image data V2*a* may be generated by a known image composition technique.

The area data V2*b* indicates an area in which the detection target M2 in an image is represented, the image being indicated by the image data V2*a* paired with the area data V2*b*. The area data V2*b* indicates, as the area in which the detection target M2 is represented, a rectangular area in which the detection target M2 is represented. The rectangular area in which the detection target M2 is represented has the aspect ratio AP. In other words, the aspect ratio of the rectangular area indicated by the area data V2*b* is the same as the aspect ratio of each of the plurality of candidate regions 2*d*.

The area data V2*b* includes position data V2*b*1 and size data V2*b*2. The position data V2*b*1 indicates a combination of a rotation angle θy and a rotation angle θp. The combination of the rotation angle θy and the rotation angle θp indicated by the position data V2*b*1 defines a central position of the rectangular area in which the detection target M2 is represented. The central position of the rectangular area in which the detection target M2 is represented is a position of a point at which two diagonal lines of the rectangular area in which the detection target M2 is represented intersect, for example. The size data V2*b*2 indicates the size of the rectangular area in which the detection target M2 is represented. The size data V2*b*2 indicates a ratio of the size of the rectangular area in which the detection target M2 is represented to the size of the reference rectangular area. The size data V2*b*2 may be referred to as zoom data.

The area data V2*b* indicates a correct response to be output from the estimation model 42 when the image data V2*a* is input to the estimation model 42. When the image data V2*a* is input to the estimation model 42, the estimation model 42 outputs area data V2*c*. The area data V2*c* indicates a rectangular area in which the detection target M2 in an image is estimated to be represented, the image being indicated by the input image data V2*a*.

The area data V2*c* includes position data V2*c*1 and size data V2*c*2. The position data V2*c*1 indicates a combination of a rotation angle θy and a rotation angle θp. The combination of the rotation angle θy and the rotation angle θp indicated by the position data V2*c*1 defines a central position of the rectangular area in which the detection target M2 is estimated to be represented. The central position of the rectangular area in which the detection target M2 is estimated to be represented is a position of a point at which two diagonal lines of the rectangular area in which the detection target M2 is estimated to be represented intersect, for example. The size data V2*c*2 indicates the size of the rectangular area in which the detection target M2 is estimated to be represented. The size data V2*c*2 indicates a ratio of the size of the rectangular area in which the detection target M2 is estimated to be represented to the size of the reference rectangular area. The size data V2*c*2 may be referred to as zoom data.

In FIG. 11, the estimation model 42 outputs statistically reasonable area data V2*c* for unknown image data V2*a* based on a relationship between the image data V2*a* and the area data V2*b* in the training data V2. The estimation model 42 is a trained model that is trained to learn the relationship between the image data V2*a* and the area data V2*b*. When the image data J1 is input as an unknown image data V2*a*, the estimation model 42 can determine a rectangular area, in which the detection target M2 is represented, in the image (captured image K1) indicated by the image data J1 with high accuracy.

The detector 111 inputs the image data J1 to the estimation model 42. The detector 111 acquires, as the image area data N2 indicative of the image area K12, the area data V2*c* output from the estimation model 42 in response to the image data J1 being input to the estimation model 42. As shown in FIG. 6, the image area K12 is a rectangular area in which the detection target M2 is represented. Thus, the detector 111 acquires the image area data N2 from the estimation model 42 to detect the detection target M2.

The candidate determiner 112 determines, based on a result of the detection of the target M (the detection targets M1 and M2) by the detector 111, at least one of the plurality of candidate regions 2*d*. For example, the candidate determiner 112 determines, based on the result of the detection of the target M by the detector 111, all of the plurality of candidate regions 2*d*. The candidate determiner 112 uses the image area data N1 indicative of the image area K11 to determine the candidate region 2*d*1 shown in FIG. 6. The candidate determiner 112 uses the image area data N2 indicative of the image area K12 to determine the candidate region 2*d*2 shown in FIG. 6.

Figure 14:
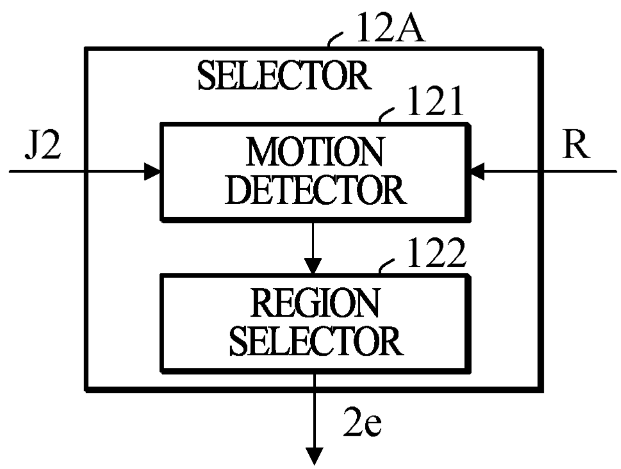
FIG. 14 is a diagram showing a selector 12A.

FIG. 14 is a diagram showing a selector 12A as an example of the selector 12. The selector 12A selects the target area 2*e* based on an amount of change in image represented in each of the plurality of candidate regions 2*d* in the captured image K2. The plurality of candidate regions 2*d* in the captured image K2 includes both an image represented in the candidate region 2*d*1, which has a position and a size indicated by the image area data N1, and an image represented in the candidate region 2*d*2, which has a position and a size indicated by the image area data N2. The selector 12A includes a motion detector 121 and a region selector 122.

The motion detector 121 detects an amount of change in the image represented in each of the plurality of candidate regions 2*d* in the captured image K2. The image represented in the candidate region 2*d* in the captured image K2 has a position and a size indicated by corresponding image area data.

For example, assuming that each of the plurality of candidate regions 2*d* is referred as a candidate region 2*dn* and that the captured image K2 is referred as a first captured image K2, the motion detector 121 detects, based on a difference between an image represented in the candidate region 2*dn* in the first captured image K2 and an image represented in the candidate region 2*dn* in a captured image K2 immediately before the first captured image K2, an amount of change in the image represented in the candidate region 2*dn*. The greater the difference, the greater the amount of change in the image represented in the candidate region 2*dn*. The smaller the difference, the smaller the amount of change in the image represented in the candidate region 2*dn*. The motion detector 121 generates a change indicator indicative of an amount of change in the image represented in each of the plurality of candidate regions 2*d*.

The region selector 122 selects, based on the change indicators for the plurality of candidate regions 2*d*, the target area 2*e* from among the plurality of candidate regions 2*d*.

Figure 15:
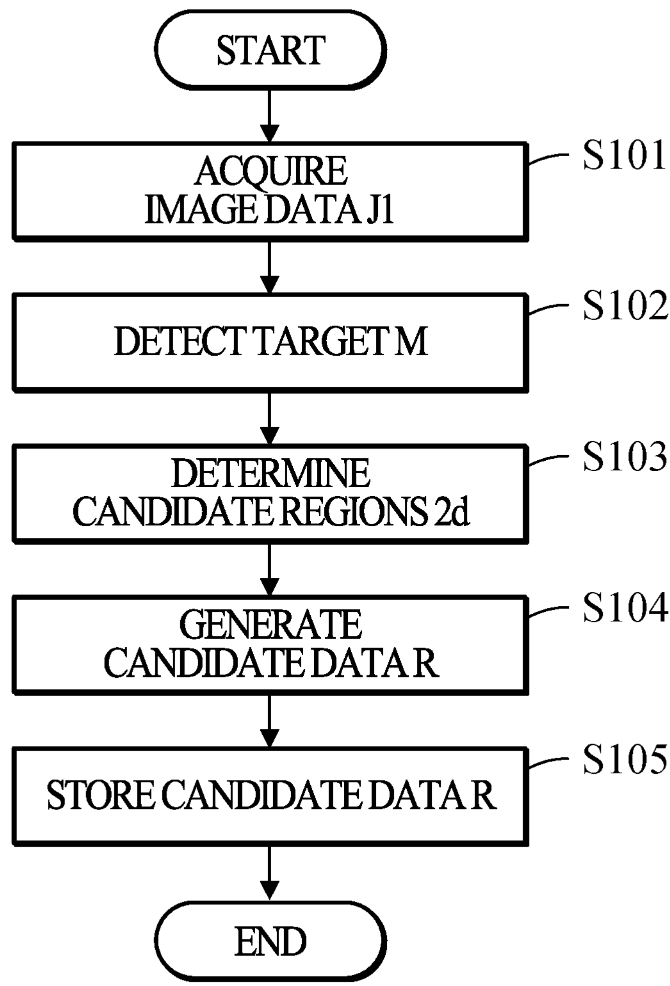
FIG. 15 is a diagram showing an example of an operation for determining a plurality of candidate regions 2*d;*

FIG. 15 is a diagram showing an example of an operation for determining the plurality of candidate regions 2*d*. The operation for determining the plurality of candidate regions 2*d* is performed before the presentation playing F2 of the piece of music C by the performance group B. The operation for determining the plurality of candidate regions 2*d* starts in response to the operating device 1*a* receiving a determination instruction from the user. In the following, an example will be described in which the determiner 11A shown in FIG. 11 is used as the determiner 11.

At step S101, the detector 111 acquires the image data J1. For example, the detector 111 acquires the image data J1 from the camera 2. When the image data J1 is stored in the storage device 1*e*, the detector 111 can acquire the image data J1 from the storage device 1*e*.

Subsequently, at step S102, the detector 111 uses the image data J1 to detect the target M (detection targets M1 and M2). For example, the detector 111 first inputs the image data J1 to each of the estimation models 41 and 42. Subsequently, the detector 111 acquires, as the image area data N1 indicative of the image area K11, the area data V1*c* output from the estimation model 41. As shown in FIG. 6, the image area K11 is an area in which the detection target M1 is represented. Subsequently, the detector 111 acquires, as the image area data N2 indicative of the image area K12, the area data V2*c* output from the estimation model 42. As shown in FIG. 6, the image area K12 is an area in which the detection target M2 is represented.

Subsequently, at step S103, the candidate determiner 112 shown in FIG. 11 determines the plurality of candidate regions 2*d* in the target capture area 2*a* of the camera 2. For example, the candidate determiner 112 determines the plurality of candidate regions 2*d* as shown in FIG. 6. The candidate determiner 112 may determine, as the candidate region 2*d*1, an area in the target capture area 2*a* of the camera 2, the area having a position and a size indicated by the image area data N1 indicative of the image area K11. In this case, the image area data N1 indicates not only the image area K11, but also the candidate region 2*d*1. The candidate determiner 112 may determine, as the candidate region 2*d*2, an area in the target capture area 2*a* of the camera 2, the area having a position and a size indicated by the image area data N2 indicating the image area K12. In this case, the image area data N2 indicates not only the image area K12, but also the candidate region 2*d*2.

Subsequently, at step S104, the candidate determiner 112 generates the candidate data R indicative of the plurality of candidate regions 2*d*. The candidate data R includes data (image area data N1) indicative of the candidate region 2*d*1, and data (image area data N2) indicative of the candidate region 2*d*2.

Subsequently, at step S105, the candidate determiner 112 stores the candidate data R in the storage device 1*e*. In response to the candidate data R being stored in the storage device 1*e*, the operation of determination of the plurality of the candidate regions 2*d* terminates.

Figure 16:
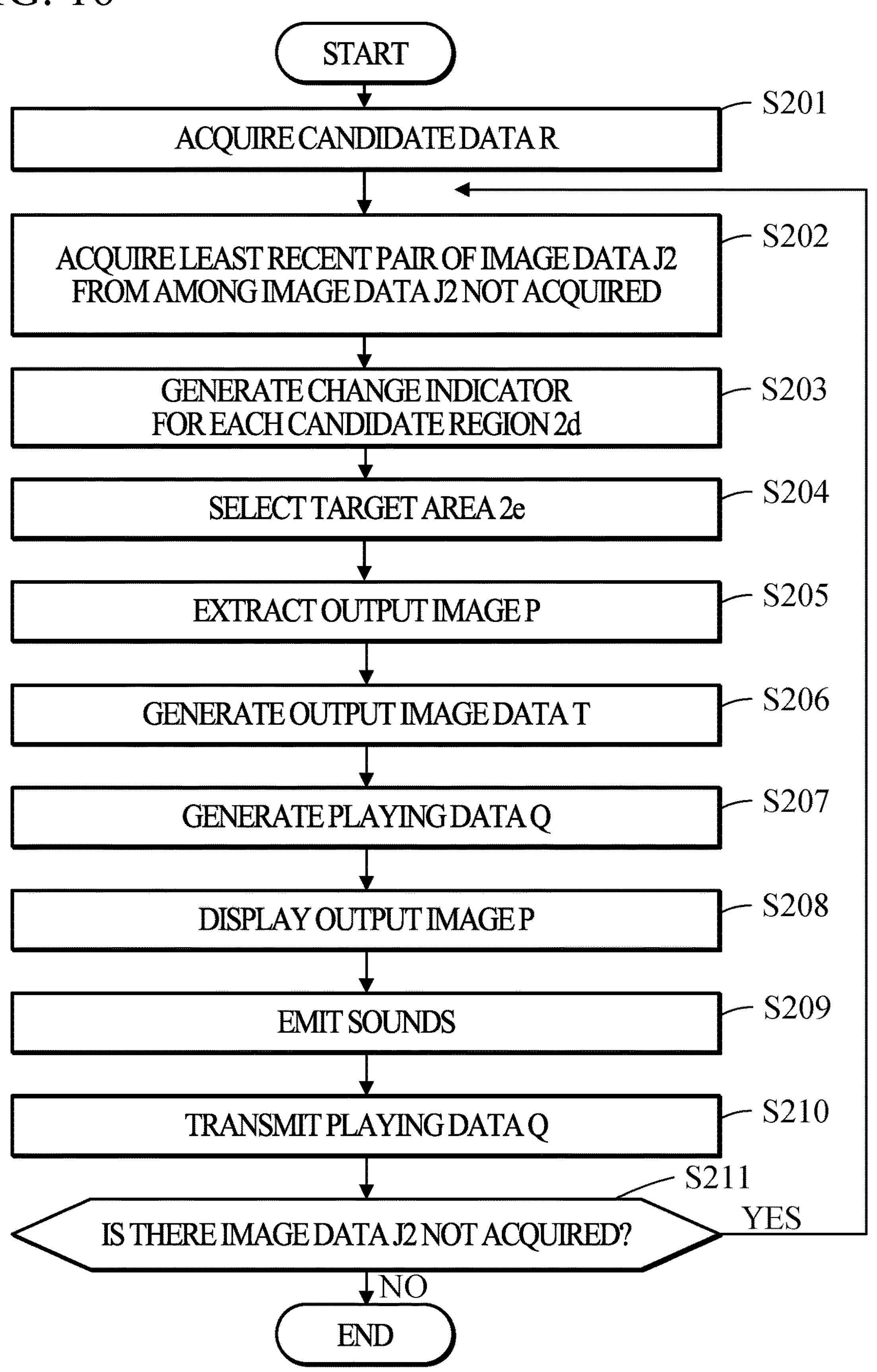
FIG. 16 is a diagram showing an example of an operation for generating playing data Q.

FIG. 16 is a diagram showing an example of an operation for generating the playing data Q. The operation for generating the playing data Q starts in response to the operating device 1*a* receiving a generation instruction from the user. In the following, an example will be described in which the selector 12A shown in FIG. 14 is used as the selector 12. The motion detector 121 deletes previous image data J2 in response to receiving the generation instruction. It is assumed here that the operation for generating the playing data Q is performed in parallel with the presentation playing F2 of the piece of music C by the performance group B.

At step S201, the motion detector 121 reads, from the storage device 1*e*, the candidate data R indicative of the plurality of candidate regions 2*d*.

At step S202, the motion detector 121 acquires a least recent pair of image data J2 from among image data J2 not acquired by the motion detector 121.

At step S203, the motion detector 121 uses the pair of image data J2 acquired at step S202 to generate the change indicator for each of the plurality of candidate regions 2*d*. The change indicator indicates the amount of change in an image represented in each of the plurality of candidate regions 2*d* in the captured image K2 representative of the performance group B in the presentation playing F2 of the piece of music C.

The image data J2 acquired at step S202 include first image data J2, and second image data J2 generated after the first image data J2. In the following, a captured image K2 indicated by the first image data J2 may be referred to as "captured image K21," and a captured image K2 indicated by the second image data J2 may be referred to as "captured image K22."

Assuming that each of the plurality of candidate regions 2*d* is referred as a candidate region 2*dn* described above, at step S203, the motion detector 121 first detects, as an amount of change in the image represented in the candidate region 2*dn*, a difference between an image represented in the candidate region 2*dn* in the captured image K21 and an image represented in the candidate region 2*dn* in the captured image K22. Subsequently, the motion detector 121 generates the change indicator indicative of the amount of change (difference) in the image represented in the candidate region 2*dn*. The change indicator for the candidate region 2*d*1 is the change indicator for the vocalist D1. The change indicator for the candidate region 2*d*2 is the change indicator for the instrumentalist D2. The motion detector 121 increases a value of the change indicator with an increase in an amount of change (difference) in image. Alternatively, the motion detector 121 may decrease a value of the change indicator with an increase in an amount of change (difference) in image. The motion detector 121 may generate the change indicator for each of the plurality of the candidate regions 2*d* at a predetermined time interval, for example, one second. The predetermined time interval is not limited to one second and may be longer or shorter than one second. For example, the motion detector 121 acquires, at a predetermined time interval, a sequence of image data J2 newly input within the predetermined time interval. The newly input sequence of image data J2 indicates a plurality of consecutive captured images K2. Subsequently, the motion detector 121 uses the newly input sequence of image data J2 to generate a change indicator for each of the plurality of candidate regions 2*d*. For example, the motion detector 121 first specifies an image represented in the candidate region 2*dn* in each of the plurality of consecutive captured images K2 indicated by the newly input sequence of image data J2. In other words, the motion detector 121 specifies, in the plurality of consecutive captured images K2, images for the candidate region 2*dn*. The motion detector 121 then sums up differences between the images for the candidate region 2*dn*. The motion detector 121 detects, as the amount of change in the image represented in the candidate region 2*dn*, the sum of the differences for the candidate region 2*dn*. Subsequently, as shown at step S203, the motion detector 121 generates the change indicator indicative of the amount of change in the image represented in the candidate region 2*dn*.

Subsequently, at step S204, the region selector 122 selects, based on the change indicators for the plurality of candidate regions 2*d*, the target area 2*e* from among the plurality of candidate regions 2*d*. In a state in which the motion detector 121 generates new change indicators for the plurality of candidate regions 2*d* at a predetermined time interval, the region selector 122 selects, based on the new change indicators for the plurality of candidate regions 2*d*, the target area 2*e* from among the plurality of candidate regions 2*d* each time the new change indicators for the plurality of candidate regions 2*d* are generated.

In a state in which a value of the change indicator is increased with an increase in an amount of change in an image, the region selector 122 selects, as the target area 2*e*, a candidate region 2*d* from among the plurality of candidate regions 2*d*, the selected candidate region 2*d* having the change indicator of the greatest value.

In a state in which there is a plurality of candidate regions 2*d*, each having the change indicator of the greatest value, the region selector 122 selects the target area 2*e* from among the plurality of candidate regions 2*d* each having the change indicator of the greatest value. For example, the region selector 122 randomly selects the target area 2*e* from among the plurality of candidate regions 2*d* each having the change indicator of the greatest value. In a state in which a level of priority is set for each of the plurality of candidate regions 2*d*, the region selector 122 may select, as the target area 2*e*, the candidate region 2*d* having the highest priority from among the plurality of candidate regions 2*d* each having the change indicator of the greatest value.

In a state in which a value of the change indicator is decreased with an increase in an amount of change in an image, the region selector 122 selects, as the target area 2*e*, a candidate region 2*d* from among the plurality of candidate regions 2*d*, the selected candidate region 2*d* having the change indicator of the smallest value.

In a state in which there is a plurality of candidate regions 2*d* each having the change indicator of the smallest value, the region selector 122 selects the target area 2*e* from among the plurality of candidate regions 2*d* each having the change indicator of the smallest value. For example, the region selector 122 randomly selects the target area 2*e* from among the plurality of candidate regions 2*d* each having the change indicator of the smallest value. In a state in which a level of priority is set for each of the plurality of candidate regions 2*d*, the region selector 122 may select, as the target area 2*e*, the candidate region 2*d* having the highest priority from among the plurality of candidate regions 2*d* each having the change indicator of the smallest value.

A large amount of change (difference) in image means a large movement of a player D represented in image. The large movement of the player D tends to cause a state in which the player D becomes notable. The player D may become notable when the player D alone plays the piece of music C, or when the player D is a player who makes large movements in playing the piece of music C. Thus, the region selector 122 selects, as the target area 2*e*, the candidate region 2*d* in which a player D is represented in a notable state.

Subsequently, as shown in FIG. 8, at step S205, the extractor 13 extracts, as the output image P, the image represented in the target area 2*e* in the captured image K2 representative of the performance group B in the presentation playing F2 of the piece of music C from the captured image K2. For example, the extractor 13 extracts, from the captured image K2, the output image P that is an image represented in the latest target area 2*e* in the captured image K2.

Subsequently, at step S206, the extractor 13 generates the output image data T indicative of the output image P.

Then, at step S207, the generator 14 generates the playing data Q that includes both the output image data T and the audio data L. The audio data L is audio data generated by the microphone 3 during the presentation playing F2 of the piece of music C by the performance group B. Thus, the playing data Q indicates not only an image of the performance group B in the presentation playing F2 of the piece of music C, but also audio based on the sounds produced by the performance group B in the presentation playing F2 of the piece of music C.

At step S207, the generator 14 changes for transmission a resolution (a number of pixels in the horizontal direction and a number of pixels in the vertical direction) of the output image data T. The resolution for transmission is set in advance.

Subsequently, at step S208, the output controller 15 provides the display 1*b* with the output image data T included in the playing data Q to cause the display 1*b* to display the output image P indicated by the output image data T.

Subsequently, at step S209, the output controller 15 provides the loudspeaker 1*c* with the audio data L included in the playing data Q to cause the loudspeaker 1*c* to emit sounds based on the audio data L.

Subsequently, at step S210, the communication controller 16 transmits the playing data Q from the communication device 1*d* to the external device 5 via the communication network NW.

A processing order from step S208 to step S210 can be changed, as appropriate.

Next, at step S211, the motion detector 121 determines whether unacquired image data J2 exists. When the motion detector 121 determines that unacquired image data J2 exists, the processing returns to step S202 to repeat the operation described above. Thus, the selector 12A sequentially selects the target area 2*e* in parallel with the presentation playing F2 of the piece of music C by the performance group B.

In a state in which the operation described above is repeated, the selector 12A changes the target area 2*e* for another target area 2*e* dependent on movements of each of the plurality of players D in the presentation playing F2 of the piece of music C. Thus, the playing data Q is generated during a change in a notable player D among the plurality of players D. When the motion detector 121 does not determine that unacquired image data J2 exists at step S211, the operation shown in FIG. 16 terminates. When the operation terminates as described above, the following state may occur. Specifically, before the performance recording system 1 receives a latest image data J2, the operation may terminate in response to completion of processing of image data J2 generated before the latest image data J2 is generated. Thus, when the motion detector 121 does not determine that unacquired image data J2 exists at step S211, the motion detector 121 may wait for image data J2 until a wait time elapses. The wait time is, for example, 0.5 seconds, but is not limited to 0.5 seconds, and may be longer or shorter than 0.5 seconds. In this case, when the motion detector 121 acquires the image data J2 until the wait time elapses, the processing returns to step S202. When the motion detector 121 does not acquire the image data J2 until the wait time elapses, the operation shown in FIG. 16 terminates.

The determiner 11 determines the plurality of candidate regions 2*d* by use of the captured image K1 representative of the performance group B in the rehearsal playing F1 of the piece of music C. The selector 12 selects the target area 2*e* from among the plurality of candidate regions 2*d*. The extractor 13 extracts an image (output image P) from the captured image K2 representative of the performance group B in the presentation playing F2 of the piece of music C, the image (output image P) being a portion of the captured image K2, the portion of the captured image K2 being a portion corresponding to the target area 2*e*. Thus, it is possible to reduce both time and effort required to create musical content representative of the group of players D. In addition, the output image P can be generated by a simple system that is constituted of the performance recording system 1, the camera 2, and the microphone 3.

The detector 111 detects, from the captured image K1, the target M (at least a portion of the body of the player D and the musical instrument E). The candidate determiner 112 determines, based on a result of the detection by the detector 111, at least one of the plurality of candidate regions 2*d*. Thus, at least one of the plurality of candidate regions 2*d* can be automatically determined based on the detected at least the portion of the body of the player D and the detected musical instrument E. As a result, it is possible to further reduce both time and effort required by the user.

The selector 12A selects the target area 2*e* based on the amount of change in the image represented in each of the plurality of candidate regions 2*d* in the captured image K2 representative of the performance group B in the presentation playing F2 of the piece of music C. Thus, the target area 2*e* can be selected automatically. As a result, it is possible to further reduce both time and effort required by the user.

The extractor 13 extracts the output image P from the captured image K2 representative of the performance group B in the presentation playing F2 of the piece of music C. Thus, it is possible to readily create an image of the performance group B including the plurality of players D in playing of the piece of music C.

The extractor 13 extracts the output image P from the captured image K2 at a point of time based on a point of time of the selecting of the target area 2*e*. Thus, it is possible to extract the output image P at the point of time based on the point of time of the selecting of the target area 2*e* (for example, at a point of time dependent on the point of time of the selecting of the target area 2*e*).

The following are examples of modifications of the embodiment. Two or more modifications freely selected from the following modifications may be combined as long as no conflict arises from any such combination.

In the embodiment, the number of candidate regions 2*d* may be greater than the number of players D. For example, in a state in which the performance group B consists of three players D, the plurality of candidate regions 2*d* may be four or more candidate regions 2*d*. The determiner 11 may determine, as the plurality of candidate regions 2*d*, not only the candidate regions 2*d*1 and 2*d*2, but also a candidate region 2*d*3 corresponding to a position of a face of the vocalist D1, and a candidate region 2*d*4 corresponding to a position of a hand of the instrumentalist D2.

Figures 17, 18:
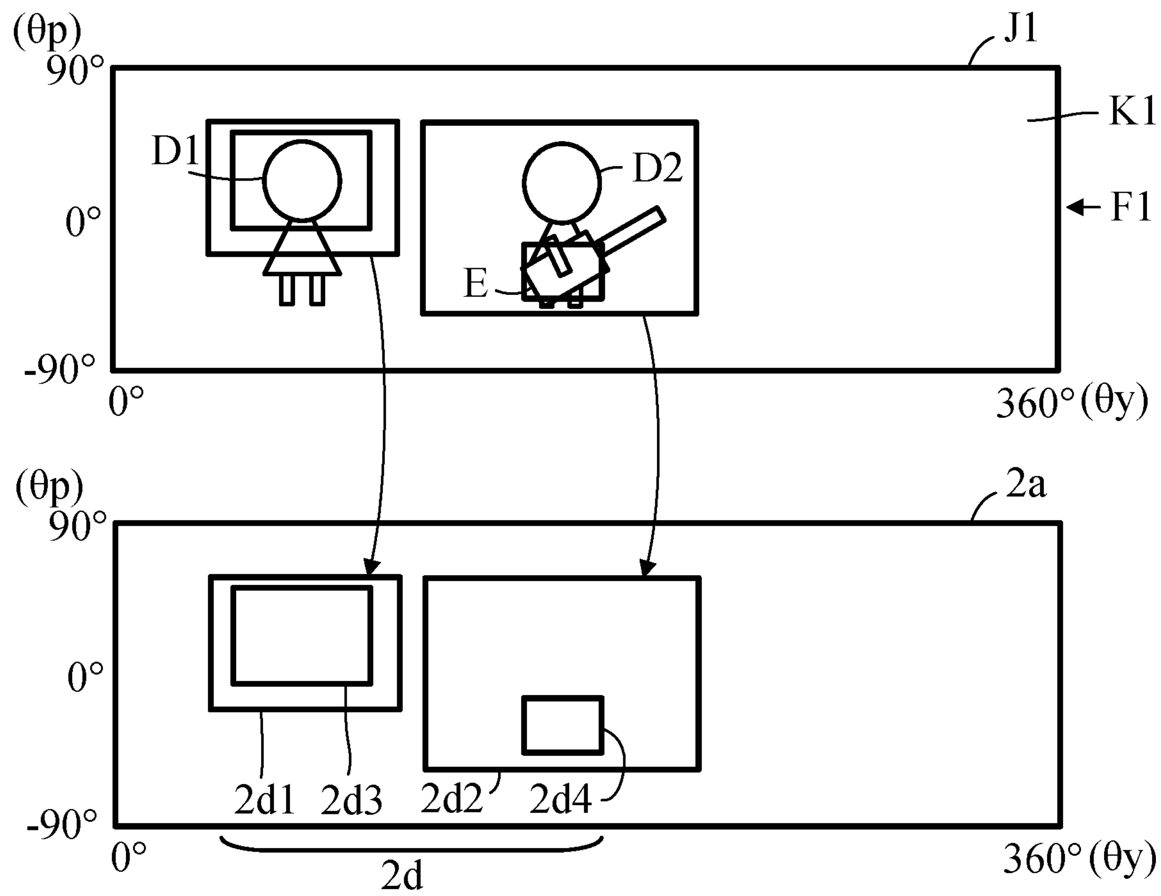
FIG. 17 is a diagram showing examples of candidate regions 2*d*3 and 2*d*4.
FIG. 18 is a diagram showing examples of weight coefficients W1 and W2 that are dependent on a genre of a piece of music C.

FIG. 17 is a diagram showing an example of each of the candidate regions 2*d*3 and 2*d*4. In a state in which the plurality of candidate regions 2*d* includes the candidate region 2*d*3 corresponding to the position of the face of the vocalist D1, it is possible to generate an output image P representative of a movement such as eye contact of the vocalist D1. In a state in which the plurality of candidate regions 2*d* includes the candidate region 2*d*4 corresponding to the position of a hand of the instrumentalist D2, it is possible to generate an output image P representative of an operation of the musical instrument E by the instrumentalist D2. For example, it is possible to generate an output image P representative of playing of the musical instrument E by a hand of the instrumentalist D2. The determiner 11 may determine the candidate regions 2*d*3 and 2*d*4 in the same manner as the candidate regions 2*d*1 and 2*d*2 by executing an image processing technique using an estimation model such as a trained model.

The determiner 11 may specify an image candidate in which all of the plurality of players D are represented to determine a candidate region corresponding to the image candidate (the image candidate in which all of the plurality of players D are represented). In this case, the determiner 11 specifies the image candidate, in which all of the plurality of players D are represented, by executing an image processing technique using an estimation model such as a trained model.

According to the first modification, it is possible to set two or more candidate regions 2*d* for at least one player D. Thus, it is possible to generate output images P in a variety of camera angles for at least the one player D.

The determiner 11 may change the plurality of candidate regions 2*d* dependent on the genre of the piece of music C, dependent on the name of the piece of music C, or dependent on the type of the performance group B. For example, when the genre of the piece of music C is rock, the determiner 11 selects the candidate regions 2*d*1 to 2*d*4 as the plurality of candidate regions 2*d*. When the genre of the piece of music C is jazz, the determiner 11 selects the candidate regions 2*d*1 and 2*d*2 as the plurality of candidate regions 2*d*. When the type of the performance group B is a rock band, the determiner 11 selects the candidate regions 2*d*1 to 2*d*4 as the plurality of candidate regions 2*d*. When the type of the performance group B is a jazz band, the determiner 11 selects the candidate regions 2*d*1 and 2*d*2 as the plurality of candidate regions 2*d*. In this case, the determiner 11 receives from the user via the operating device 1*a*, classification information indicative of the genre of the piece of music C, classification information indicative of the name of the piece of music C, or classification information indicative of the type of the performance group B. The determiner 11 changes the plurality of candidate regions 2*d* based on the received classification information. Thus, the user can change the plurality of candidate regions 2*d* by use of the classification information.

In the embodiment and the first modification, the determiner 11 may determine at least one of the plurality of candidate regions 2*d* based on an image area selected by the user from among the plurality of image areas (for example, the image areas K11 and K12 shown in FIG. 6).

For example, when the determiner 11 sets two or more image areas (for example, the image areas K11 and K12 shown in FIG. 6) in the captured image K1 representative of the performance group B in the rehearsal playing F1 of the piece of music C, the determiner 11 causes the display 1*b* to display the two or more image areas. The determiner 11 determines at least one of the plurality of candidate regions 2*d* based on the image area selected by the user from among the two or more image areas displayed on the display 1*b*.

For example, the determiner 11 specifies, as a selected image area, the image area selected by the user from among the two or more image areas displayed on the display 1*b*. The determiner 11 generates image area data indicative of the selected image area. The image area data indicative of the selected image area indicates a central position of the selected image area and a size of the selected image area. The central position of the selected image area is indicated by a combination of a rotation angle θy and a rotation angle θp. The size of the selected image area is indicated by a ratio of the size of the selected image area to the size of the reference rectangular area. The determiner 11 determines, as the candidate region 2*d*, an area in the target capture area 2*a*, the area in the target capture area 2*a* having a position and a size indicated by the image area data indicative of the selected image area.

According to the second modification, to determine the plurality of candidate regions 2*d*, the image area selected by a user is used. Thus, it is possible to determine the plurality of candidate regions 2*d* dependent on user preferences.

In the embodiment, the first modification, and the second modification, the determiner 11 may determine at least one of the plurality of candidate regions 2*d* based on a user-set image area in the captured image K1 representative of the performance group B in the rehearsal playing F1 of the piece of music C.

For example, when the determiner 11 sets two or more image areas (for example, the image areas K11 and K12 shown in FIG. 6) in the captured image K1, the determiner 11 causes the display 1*b* to display the two or more image areas. The determiner 11 determines, based on one or more image areas, of each of which a position or a size is changed by the user, among the two or more image areas displayed on the display 1*b*, one or more candidate regions 2*d* of which the number is the same as the number of one or more image areas (the one or more image areas of each of which a position or a size is changed by the user). The one or more image areas of each of which a position or a size is changed by the user are included in an example of the user-set image area.

The determiner 11 may cause the display 1*b* to display the captured image K1. In this case, the determiner 11 determines, based on one or more user-set image areas in the captured image K1 displayed on the display 1*b*, one or more candidate regions 2*d* of which the number is the same as the number of one or more user-set image areas. In this case, the determiner 11 limits an aspect ratio of the each of the one or more user-set image areas to the aspect ratio AP. The determiner 11 generates image area data indicative of the one or more user-set image areas. The image area data indicative of the one or more user-set image areas indicates a central position of each of the one or more user-set image areas and a size of each of the one or more user-set image areas. The central position of each of the one or more user-set image areas is indicated by a combination of a rotation angle θy and a rotation angle θp. The size of the each of the one or more user-set image areas is indicated by a ratio of the size of each of the one or more user-set image areas to the size of the reference rectangular area.

A method for determining one or more candidate regions 2*d* either based on the one or more user-set image areas or on the one or more user-changed image areas, is carried out in the same manner as the method for determining the candidate regions 2*d*1 based on the image area K11.

According to the third modification, to determine the plurality of candidate regions 2*d*, one or more user-set image areas or one or more user-changed image areas are used. Thus, it is possible to determine the plurality of candidate regions 2*d* dependent on user preferences.

In the embodiment and the first to third modifications, the determiner 11 may estimate, based on the audio obtained by the microphone 3 receiving the sounds produced in the rehearsal playing F1 of the piece of music C by the performance group B, an area in the target capture area 2*a* in which the musical instrument E is represented.

In a fourth modification, the microphone 3 is directional, for example. The directional microphone 3 is a microphone that is constituted of a plurality of directional microphones. Each of the plurality of directional microphones has a sound receiving area dependent on direction. The sound receiving areas of the plurality of microphones differ from each other. As long as the sound receiving areas of the plurality of directional microphones differ from each other, at least one of the plurality of microphones may be a non-directional microphone.

The determiner 11 specifies, as a target microphone, a microphone that has received the loudest sound from among the plurality of microphones that constitutes the microphone 3. The determiner 11 estimates, as the area in the target capture area 2*a* in which the musical instrument E is represented, an area in the target capture area 2*a* that overlaps with the sound receiving area of the target microphone. Alternatively, the determiner 11 may estimate, based on results of receiving sounds from the plurality of microphones that constitutes the microphone 3, the area in the target capture area 2*a* in which the musical instrument E is represented. For example, in a state in which the sound receiving areas of the plurality of microphones overlap with each other, the determiner 11 first specifies, as one or more detection microphones, one or more microphones that receive sounds having a level greater than or equal to a reference level. When the determiner 11 specifies one detection microphone as the one or more detection microphones, the determiner 11 estimates, as the area in the target capture area 2*a* in which the musical instrument E is represented, an area in the target capture area 2*a* that overlaps with the sound receiving area of the one detection microphone. When the determiner 11 specifies a plurality of detection microphones as the one or more detection microphones, the determiner 11 specifies, as an overlapping area, an area in which the sound receiving areas of the plurality of detection microphones overlap with each other. The determiner 11 estimates, as the area in the target capture area 2*a* in which the musical instrument E is represented, an area in the target capture area 2*a* that overlaps with the overlapping area.

The determiner 11 may estimate, based on a result of the estimation of the area in the target capture area 2*a* in which the musical instrument E is represented, at least one of the plurality of candidate regions 2*d*. For example, the determiner 11 determines, as one of the plurality of candidate regions 2*d*, the estimated area in the target capture area 2*a* in which the musical instrument E is represented.

According to the fourth modification, at least one of the plurality of candidate regions 2*d* is determined based on the detected at least the portion of the body of the player D and the detected musical instrument E, and on the estimated area in the target capture area 2*a* in which the musical instrument E is represented. Thus, compared to a configuration in which at least one of the plurality of candidate regions 2*d* is determined based only on the detected at least the portion of the body of the player D and the detected musical instrument E, it is possible to determine various candidate regions 2*d*.

In the embodiment and the first to fourth modifications, the microphone 3 is directional, and the selector 12 may select the target area 2*e* based on the amount of change in image represented in each of the plurality of candidate regions 2*d* in the captured image K2, and on audio obtained by the microphone 3 receiving the sounds produced in the presentation playing F2 of the piece of music C by the performance group B.

For example, the selector 12 first specifies, as a detection microphone, a microphone that receives sounds that have a level greater than or equal to a threshold level from among the plurality of microphones that constitutes the microphone 3. Subsequently, the selector 12 specifies a candidate region 2*d* that overlaps with the sound receiving area of the detection microphone. Subsequently, the selector 12 adjusts the change indicator for the candidate region 2*d* that overlaps with the sound receiving area of the detection microphone. In a state in which a value of the change indicator is increased with an increase in an amount of change in the image represented in the candidate region 2*d*, the selector 12 increases the value of the change indicator for the candidate region 2*d* that overlaps with the sound receiving area of the detection microphone by an adjustment value. The adjustment value is a predetermined value. In a state in which a value of the change indicator is decreased with an increase in an amount of change in the image represented in the candidate region 2*d*, the selector 12 decreases the value of the change indicator for the candidate region 2*d* that overlaps with the sound receiving area of the detection microphone by the adjustment value. Subsequently, the selector 12 selects the target area 2*e* from among the plurality of candidate regions 2*d* based on the change indicators for the plurality of candidate regions 2*d*.

According to the fifth modification, the selector 12 selects the target area 2*e* based on the amount of change in the image represented in each of the plurality of candidate regions 2*d* in the captured image K2, and on the audio obtained by the microphone 3 receiving the sounds produced in the presentation playing F2 of the piece of music C by the performance group B. Thus, compared to a configuration in which the target area 2*e* is selected based only on the amount of change in the image represented in each of the plurality of candidate regions 2*d* in the captured image K2, it is possible to variously change the target area 2*e*.

To adjust the value of the change indicator, the selector 12 may use information other than the audio obtained from the sounds produced in the presentation playing F2 of the piece of music C by the performance group B. For example, the selector 12 may adjust the value of the change indicator based on one or more specific movements of the player D. The one or more specific movements may include a movement in which the player' right hand is raised, a movement in which the player's head nods, or a movement in which the player moves the musical instrument E. The one or more specific movements may be referred to as one or more notable movements. The specific movements differ from each other. The selector 12 may detect the one or more specific movements by use of an image recognition technique.

Adjustment by the selector 12 of the value of the change indicator based on the one or more specific movements of the player D causes the selector 12 to select the target area 2*e* based on the amount of change in the image represented in each of the plurality of candidate regions 2*d* in the captured image K2, and on the one or more specific movements of the player D. Thus, compared to a configuration in which the target area 2*e* is selected based only on the amount of change in the image represented in each of the plurality of candidate regions 2*d* in the captured image K2, it is possible to variously change the target area 2*e*. For example, it is possible to change the player D shown in the output image P dependent on the plurality of players D raising, in order, their right hands.

In the embodiment and the first to fifth modifications, the selector 12 may select the target area 2*e* based on an indicator obtained by weighting the amount of change in the image represented in each of the plurality of candidate regions 2*d* in the captured image K2.

For example, in the embodiment and the first to fifth modifications, when the instrumentalist D2 moves more significantly than the vocalist D1 in the presentation playing F2 of the piece of music C, a majority of the output images P may be representative of the instrumentalist D2. However, there may be a demand for a majority of the output images P to be representative of the vocalist D1, who does not move as much as the instrumentalist D2. A sixth modification is an example of a measure to meet such a demand. For example, the selector 12 applies a weight, which is greater than a weight for the instrumentalist D2, to a change indicator for the vocalist D1.

The selector 12 calculates, as an indicator for the vocalist D1, an indicator obtained by multiplying the change indicator for the vocalist D1 by a weight coefficient W1. The selector 12 calculates, as an indicator for the instrumentalist D2, an indicator obtained by multiplying a change indicator for the instrumentalist D2 by a weight coefficient W2. The selector 12 selects the target area 2*e* based on the indicator for the vocalist D1 and on the indicator for the instrumentalist D2.

The weight coefficients W1 and W2 are set by the user, for example. The weight coefficients W1 and W2 may be predetermined. The weight coefficients W1 and W2 may be adjusted dependent on an adjustment instruction input by the user via the operating device 1*a*. The indicator for the vocalist D1 and the indicator for the instrumentalist D2 are each an example of the indicator obtained by weighting the amount of change in the image represented in each of the plurality of candidate regions 2*d* in the captured image K2 representative of the performance group B in the presentation playing F2 of the piece of music C.

In a state in which a value of the change indicator is increased with an increase in an amount of change in the image represented in the candidate region 2*d*, the weight coefficient W1 is set to be greater than the weight coefficient W2. In this state, when the indicator for the vocalist D1 is greater than the indicator for the instrumentalist D2, the selector 12 selects the candidate region 2*d*1 for the vocalist D1 as the target area 2*e*. When the indicator for the instrumentalist D2 is greater than the indicator for the vocalist D1, the selector 12 selects the candidate region 2*d*2 for the instrumentalist D2 as the target area 2*e*.

In a state in which a value of the change indicator is decreased with an increase in an amount of change in the image represented in the candidate region 2*d*, the weight coefficient W1 is set to be less than the weight coefficient W2. In this state, when the indicator for the vocalist D1 is less than the indicator for the instrumentalist D2, the selector 12 selects the candidate region 2*d*1 for the vocalist D1 as the target area 2*e*. When the indicator for the instrumentalist D2 is less than the indicator for the vocalist D1, the selector 12 selects the candidate region 2*d*2 for the instrumentalist D2 as the target area 2*e*.

When the indicator for the vocalist D1 is equal to the indicator for the instrumentalist D2, the selector 12 randomly selects as the target area 2*e*, either the candidate region 2*d*1 for the vocalist D1 or the candidate region 2*d*2 for the instrumentalist D2. It is assumed that a level of priority is set to the candidate region 2*d*1 for the vocalist D1 and the candidate region 2*d*2 for the instrumentalist D2. In this state, when the indicator for the vocalist D1 is equal to the indicator for the instrumentalist D2, the selector 12 may select, as the target area 2*e*, the candidate region 2*d* having the highest priority from the candidate regions 2*d*1 and 2*d*2.

The weight coefficient W1 and the weight coefficient W2 are each set dependent on the type of player D (vocalist or instrumentalist). The type of player D is not limited to vocalist or instrumentalist. The type of player D may be a vocalist, a guitarist, a bassist, or a drummer.

The weight coefficient W1 and the weight coefficient W2 may each be set dependent on information different from the type of player D. For example, the weight coefficient W1 and the weight coefficient W2 may each be set dependent on the genre of the piece of music C.

FIG. 18 is a diagram showing a genre table JT representative of examples of the weight coefficients W1 and W2 dependent on the genre of the piece of music C. In FIG. 18, pop and jazz are each shown as an example of the genre of the piece of music C. However, the genre of the piece of music C is not limited to pop or jazz. The genre of the piece of music C may be rock or classical music. The genre table JT is stored in the storage device 1*e*, for example. The selector 12 refers to the genre table JT to select the weight coefficients W1 and W2 dependent on the genre of the piece of music C input by the user via the operating device 1*a*. Subsequently, the selector 12 generates the indicator for the vocalist D1 and the indicator for the instrumentalist D2 by multiplying the weight coefficient W1 and the weight coefficient W2, which correspond to the input genre of the piece of music C, by the change indicator for the vocalist D1 and the change indicator for the instrumentalist D2, respectively. The selector 12 selects the target area 2*e* based on the indicator for the vocalist D1 and the indicator for the instrumentalist D2.

The weight coefficient W1 and the weight coefficient W2 may each be set dependent on a musical number of the piece of music C. In this case, the selector 12 can change the target area 2*e* dependent on the musical number of the piece of music C.

According to the sixth modification, it is possible to adjust the candidate region 2*d*, which is to be selected as the target area 2*e*, by use of weighting. Weighting may be applied not only to an image represented in each of the plurality of candidate regions 2*d*, but also to a level of the audio obtained by the microphone 3 including the plurality of microphones 3 receiving sounds. For example, in a state in which there is a microphone having a sound receiving area in which the vocalist D1 is present, to emphasize a singing voice of the vocalist D1, a weight gain of the microphone is set to be greater than a weight gain of each of the other microphones. In this case, the singing voice of the vocalist D1 is amplified to a greater extent than the other sounds so that the singing voice of the vocalist D1 is emphasized. The weight gain of the microphone set to be greater than the weight gain of each of the other microphones, is an example of weighting a level of audio generated by the microphone 3 receiving sounds. However, weighting of a level of audio generated by the microphone 3 receiving sounds is not limited to this example. For example, weighting a gain of each of the plurality of microphones may be changed with progression of the presentation playing F2 of the piece of music C by the performance group B.

In the embodiment and the first to sixth modifications, the selector 12 may select the target area 2*e* based on an image represented in a user-selected candidate region 2*d* among the plurality of candidate regions 2*d* in the captured image K2 representative of the performance group B in the presentation playing F2 of the piece of music C.

For example, the selector 12 causes the display 1*b* to display images represented in the plurality of candidate regions 2*d* in the captured image K2 representative of the performance group B in the presentation playing F2 of the piece of music C, in parallel with the presentation playing F2 of the piece of music C by the performance group B. The user, who differs from each of the plurality of players D, uses the operating device 1*a* to select an image represented in a candidate region 2*d* from among the images represented in the plurality of candidate regions 2*d* displayed on the display 1*b*. The selector 12 selects the target area 2*e* based on the image represented in the candidate region 2*d* selected by the user. For example, the selector 12 selects, as the target area 2*e*, the candidate region 2*d* selected by the user. The selector 12 may adjust a change indicator for the candidate region 2*d* selected by the user to select, as the target area 2*e*, the candidate region 2*d* selected by the user. In this case, it is possible to manually select the target area 2*e* in parallel with the presentation playing F2 of the piece of music C by the performance group B.

The selector 12 may select the target area 2*e* prior to the presentation playing F2 of the piece of music C by the performance group B. For example, the selector 12 first causes the display 1*b* to display video represented in each of the plurality of candidate regions 2*d* by use of the series of captured image K1 representative of the performance group B in the rehearsal playing F1 of the piece of music C. With progression of the video of the performance group B in the rehearsal playing F1 of the piece of music C represented in the plurality of candidate regions 2*d*, the user sequentially performs selection of video of the performance group B in the rehearsal playing F1 of the piece of music C represented in one of the plurality of candidate regions 2*d*. Specifically, the user changes selected video with the progression of the video of the performance group B in the rehearsal playing F1 of the piece of music C. The selector 12 sequentially selects, as the target area 2*e*, the candidate region 2*d* that represents the video selected by the user with the progression of the video of the performance group B in the rehearsal playing F1 of the piece of music C. The selector 12 stores, in the storage device 1*e*, selection information indicative of a result of sequential selection of the target area 2*e*, and also of an elapsed time of the rehearsal playing F1 of the piece of music C by the performance group B. When the performance group B starts the presentation playing F2 of the piece of music C, the extractor 13 extracts the output images P based on the target area 2*e* that is changed dependent on the elapsed time indicated by the selection information. In this case, prior to the presentation playing F2 of the piece of music C by the performance group B, it is possible to estimate the output image P generated from the presentation playing F2 of the piece of music C by the performance group B.

According to the seventh modification, a user-selected candidate region 2*d* is used to select the target area 2*e*. Thus, it is possible to select the target area 2*e* dependent on user preferences.

In the embodiment and the first to seventh modifications, the captured image K2 to be input to the extractor 13 (the image representative of the performance group B in the presentation playing F2 of the piece of music C) may be delayed compared to the captured image K2 to be input to the selector 12 (the image representative of the performance group B in the presentation playing F2 of the piece of music C).

The selector 12 selects the target area 2*e* based on the change in the image in the captured image K2. The extractor 13 extracts the output image P from the captured image K2 by use of the target area 2*e* selected based on the captured image K2. Thus, if the captured image K2 to be input to the extractor 13 is synchronized with the captured image K2 to be input to the selector 12, it is difficult to generate, as output images P, an image of the player D that starts moving and an image of the player D immediately before starting moving. An eighth modification is an example of a measure to overcome a disadvantage in that it is difficult to generate, as the output image P, an image of the player D that starts moving and an image of the player D immediately before starting moving.

In the eighth modification, for example, whereas the selector 12 uses the captured image K2 that is not delayed, the extractor 13 uses the captured image K2 that is delayed by an adjustment time. The adjustment time is one second, for example. The adjustment time may be longer or shorter than one second. The extractor 13 extracts the output image P from a captured image K2 generated at a point of time that is the adjustment time prior to a point of time of generating a captured image K2 from which the selector 12 extracts the target area 2*e*.

According to the eighth modification, it is possible to readily generate, as the output images P, an image of the player D that starts moving and an image of the player D immediately before starting moving. In the eighth modification, the generator 14 uses the audio data L that is delayed by the adjustment time. Thus, in the playing data Q, synchronization of the image and sound is maintained.

In the embodiment and the first to eighth modifications, the extractor 13 may extract the output image P from the captured image K2 to a rhythm of the sounds produced in the presentation playing F2 of the piece of music C by the performance group B. In other words, the extractor 13 may change the output image P from the captured image K2 to a rhythm of the sounds produced in the presentation playing F2 of the piece of music C by the performance group B.

For example, the extractor 13 estimates a rhythm (beat) of the piece of music C based on audio obtained dependent on sounds produced by the musical instrument E (for example, a drum kit or a bass guitar) during the presentation playing F2 of the piece of music C by the performance group B. The extractor 13 extracts the output image P from the captured image K2 to the rhythm of the piece of music C.

According to the ninth modification, the extractor 13 extracts the output image P from the captured image K2 to the rhythm of the audio obtained by receiving the sounds produced in the presentation playing F2 of the piece of music C by the performance group B. Thus, the output image P2 can be extracted to the rhythm dependent on the presentation playing F2 of the piece of music C by the performance group B.

In the embodiment and the first to ninth modifications, dependent on change of the target area 2*e*, the extractor 13 may change the output images P such that the camera pans. In a state in which the extractor 13 changes the target area 2*e*, the extractor 13 may fade in an output image P that is to be represented while fading out an output image P that has been represented.

According to the tenth modification, it is possible to smoothly change the output image P. In addition, it is possible to visually direct a change of the output image P.

In the embodiment and the first to tenth modifications, the selector 12 may select a plurality of target areas 2*e*. For example, in a state in which a value of the change indicator is increased with an increase in an amount of change of an image, the selector 12 selects, as the plurality of target areas 2*e*, a candidate region 2*d* with a greatest value change indicator and a candidate region 2*d* with a second greatest value change indicator.

Assuming that each of the plurality of target areas 2*e* is referred to as a target area 2*en*, the extractor 13 extracts an image represented in the target areas 2*en* from the captured image K2 representative of the performance group B in the presentation playing F2 of the piece of music C, as an output image P of a plurality of output images P.

According to the eleventh modification, the plurality of output images P is extracted from one captured image K2. Thus, it is possible to generate playing data Q indicative of the plurality of output images P.

In the embodiment and the first to tenth modifications, the performance record is not limited to the captured image K2 generated by the camera 2 capturing the plurality of players D in the presentation playing F2 of the piece of music C. For example, the performance record may include the audio obtained by the microphone 3 receiving the sounds produced in the presentation playing F2 of the piece of music C. In this case, a portion, which corresponds to the target area 2*e*, of the performance record includes not only the image represented in the target area 2*e* in the captured image K2, but also a portion of the audio obtained by the microphone 3 receiving the sounds produced in the presentation playing F2 of the piece of music C, the portion of the audio being obtained by receiving sounds from the target area 2*e*. The portion of the audio obtained by receiving the sounds from the target area 2*e* is specified by extracting sound data, which is indicative of the portion of the audio obtained by receiving the sounds from the target area 2*e*, from sound data generated by the directional microphone 3 (a plurality of directional microphones).

The performance record may include either the captured image K2 or the audio obtained by the microphone 3 receiving the sounds produced in the presentation playing F2 of the piece of music C. In this case, the portion, which corresponds to the target area 2*e*, of the performance record is either the image represented in the target area 2*e* in the captured image K2, or the portion of the audio obtained by the microphone 3 receiving the sounds produced in the presentation playing F2 of the piece of music C, the portion of the audio being obtained by receiving the sounds from the target area 2*e*.

According to the twelfth modification, it is possible to readily create musical content representative of the performance group B including the plurality of players D in playing a piece of music.

In the embodiment and the first to twelfth modifications, the camera 2 is not limited to a 360-degree camera, and may be a camera that has an angle of view of less than 360 degrees (for example, a 180-degree camera). When the camera 2 is not a 360-degree camera, processing to expand the captured image generated by the camera 2 in a plane can be omitted. When the camera 2 is a 360-degree camera, the plurality of players D can play the piece of music C without being aware of which of the plurality of players D is within the target capture area 2*a*.

In the embodiment and the first to thirteenth modifications, the first playing and the second playing are not limited to the rehearsal playing F1 and the presentation playing F2. For example, if the presentation playing is repeated, the first playing may be presentation playing that has been performed, and the second playing may be presentation playing to be performed.

In the embodiment and the first to thirteenth modifications, the performance recording system 1 may be constituted of a server instead of a smartphone, a tablet, or a personal computer.

The following configurations are derivable from at least one of the embodiment and the modifications described above.

A performance recording method according to one aspect (first aspect) of the present disclosure is a computer-implemented performance recording method that includes: determining a plurality of candidate regions in a target capture area of a camera by use of first captured imagery generated by the camera configured to capture a plurality of players in a first playing of a piece of music; selecting a target area from among the plurality of candidate regions; and extracting, from a performance record a portion corresponding to the target area, the performance record being obtained by capturing the plurality of players in a second playing of the piece of music or being obtained by receiving sounds produced in the second playing. According to this aspect, it is possible to eliminate a need to individually record the plurality of players playing a piece of music. Thus, it is possible to reduce both time and effort required to create musical content representative of a group of players.

In an example (second aspect) of the first aspect, the plurality of players includes a player, and the determining of the plurality of candidate regions includes: detecting, from the first captured imagery, at least a portion of the player's body and a musical instrument; and determining, based on the at least the portion of the player's body and the musical instrument, at least one of the plurality of candidate regions. According to this aspect, it is possible to automatically determine, based on the at least the portion of the player's body and the musical instrument, at least one of the plurality of the candidate regions. Thus, it is possible to further reduce both time and effort required by a user.

In an example (third aspect) of the second aspect, the determining of the plurality of candidate regions includes: estimating, based on first audio obtained by receiving sounds produced in the first playing, an area in the target capture area in which the musical instrument is represented; and determining, based on the area in the target capture area in which the musical instrument is represented, at least one of the plurality of candidate regions. According to this aspect, compared to a configuration in which at least one of the plurality of candidate regions is determined based only on the detected at least the portion of the body of the player and the detected musical instrument, it is possible to determine various candidate regions.

In an example (fourth aspect) of the first aspect, the plurality of players includes a player, and the determining of the plurality of candidate regions includes: detecting at least a portion of the player's body and a musical instrument from the first captured imagery; setting, based on the at least the portion of the player's body and the musical instrument, a plurality of image areas in the first captured imagery; and determining, based on a user-selected image area among the plurality of image areas, at least one of the plurality of candidate regions. According to this aspect, to determine the plurality of candidate regions, the user-selected image area is used. Thus, it is possible to determine the plurality of candidate regions dependent on user preferences.

In an example (fifth aspect) of the first aspect, the determining of the plurality of candidate regions includes determining, based on a user-set image area in the first captured imagery, at least one of the plurality of candidate regions. According to this aspect, it is possible to determine the plurality of candidate regions dependent on user preferences.

In an example (sixth aspect) of any one of the first to fifth aspects, the selecting of the target area includes selecting the target area based on an amount of change in imagery represented in each of the plurality of candidate regions in second captured imagery representative of the plurality of players in the second playing. According to this aspect, it is possible to automatically select the target area based on an amount of change in imagery represented in each of the plurality of candidate regions in second captured imagery. Thus, it is possible to further reduce both time and effort required by a user.

In an example (seventh aspect) of the sixth aspect, the selecting of the target area includes selecting the target area based on an indicator obtained by weighting the amount of change in imagery represented in each of the plurality of candidate regions. According to this aspect, it is possible to change the candidate region, which is to be selected as the target area, by use of weighting.

In an example (eighth aspect) of any one of the first to fifth aspects, the selecting of the target area includes selecting the target area based on user-selected imagery from among imagery represented in the plurality of candidate regions in second captured imagery representative of the plurality of players in the second playing. According to this aspect, it is possible to select the target area dependent on user preferences.

In an example (ninth aspect) of any one of the first to eighth aspects, the extracting of the portion corresponding to the target area from the performance record includes extracting the portion corresponding to the target area from the performance record at a point of time dependent on a point of time of the selecting of the target area. According to this aspect, it is possible to extract the portion corresponding to the target area at a point of time dependent on a point of time of the selecting of the target area.

In an example (tenth aspect) of any one of the first to eighth aspects, the extracting of the portion corresponding to the target area from the performance record includes extracting the portion corresponding to the target area from the performance record to a rhythm of the sounds produced in the second playing. According to this aspect, it is possible to extract the portion corresponding to the target area to the rhythm of the sounds produced in the second playing.

In an example (eleventh aspect) of any one of the first to tenth aspects, the performance record is second captured imagery generated by the camera in capturing the plurality of players in the second playing, and the portion corresponding to the target area is imagery represented in the target area in the second captured imagery. According to this aspect, it is possible to readily create an image of the plurality of players in playing of a piece of music.

In an example (twelfth aspect) of any one of the first to tenth aspects, the performance record is second audio obtained by a microphone receiving the sounds produced in the second playing, and the portion corresponding to the target area is part of the second audio, the part of the second audio being obtained by receiving sounds from the target area. According to this aspect, it is possible to readily create music of the plurality of players in playing of a piece of music.

A performance recording system according to another aspect (thirteenth aspect) of the present disclosure includes: at least one memory configured to store instructions; and at least one processor configured to execute the instructions to: determine a plurality of candidate regions in a target capture area of a camera by use of first captured imagery generated by the camera configured to capture a plurality of players in a first playing of a piece of music; select a target area from among the plurality of candidate regions; and extract, from a performance record, a portion corresponding to the target area, the performance record being obtained by capturing the plurality of players in a second playing of the piece of music or being obtained by receiving sounds produced in the second playing. According to this aspect, it is possible to eliminate a need for individually recording playing of a piece of music by each of the plurality of players. Thus, it is possible to reduce both time and effort required to create musical content representative of a group of players.

A recording medium according to yet another aspect (fourteenth aspect) of the present disclosure is a non-transitory computer-readable recording medium storing instructions executable by at least one processor, which when executed cause the at least one processor to: determine a plurality of candidate regions in a target capture area of a camera by use of first captured imagery generated by the camera configured to capture a plurality of players in a first playing of a piece of music; select a target area from among the plurality of candidate regions; and extract, from a performance record, a portion corresponding to the target area, the performance record being obtained by capturing the plurality of players in a second playing of the piece of music or being obtained by receiving sounds produced in the second playing. According to this aspect, it is possible to eliminate a need for individually recording playing of a piece of music by each of the plurality of players. Thus, it is possible to reduce both time and effort required to create musical content representative of a group of players.

DESCRIPTION OF REFERENCE SIGNS

1 . . . performance recording system, 1*a* . . . operating device, 1*b* . . . display, 1*c* . . . loudspeaker, 1*d* . . . communication device, 1*e* . . . storage device, 1*f* . . . processor, 2 . . . camera, 3 . . . microphone, 11 . . . determiner, 11A . . . determiner, 12 . . . selector, 12A . . . selector, 13 . . . extractor, 14 . . . generator, 15 . . . output controller, 16 . . . communication controller, 41 . . . estimation model, 41*a* . . . provisional model, 42 . . . estimation model, 111 . . . detector, 112 . . . candidate determiner, 121 . . . motion detector, 122 . . . region selector.

What is claimed is:

1. A performance recording system comprising:
at least one memory configured to store instructions; and
at least one processor configured to execute the instructions to:
determine a plurality of candidate regions in a target capture area of a camera by use of first captured imagery generated by the camera configured to capture a plurality of players in a first playing of a piece of music;
select a target area from among the plurality of candidate regions; and
extract, from a performance record, a portion corresponding to the target area, the performance record being obtained by capturing the plurality of players in a second playing of the piece of music or being obtained by receiving sounds produced in the second playing,
wherein the plurality of players includes a player, and
wherein the determining of the plurality of candidate regions includes:
detecting at least a portion of the player's body and a musical instrument from the first captured imagery;
setting, based on the at least the portion of the player's body and the musical instrument, a plurality of image areas in the first captured imagery; and
determining, based on a user-selected image area among the plurality of image areas, at least one of the plurality of candidate regions.

2. A computer-implemented performance recording method comprising:
determining a plurality of candidate regions in a target capture area of a camera by use of first captured imagery generated by the camera configured to capture a plurality of players in a first playing of a piece of music;
selecting a target area from among the plurality of candidate regions; and
extracting, from a performance record, a portion corresponding to the target area, the performance record being obtained by capturing the plurality of players in a second playing of the piece of music or being obtained by receiving sounds produced in the second playing,
wherein the plurality of players includes a player, and
wherein the determining of the plurality of candidate regions includes:
detecting at least a portion of the player's body and a musical instrument from the first captured imagery;
setting, based on the at least the portion of the player's body and the musical instrument, a plurality of image areas in the first captured imagery; and
determining, based on a user-selected image area among the plurality of image areas, at least one of the plurality of candidate regions.

3. The performance recording method according to claim 2,
wherein the plurality of players includes a player, and
wherein the determining of the plurality of candidate regions includes:
detecting, from the first captured imagery, at least a portion of the player's body and a musical instrument; and
determining, based on the at least the portion of the player's body and the musical instrument, at least one of the plurality of candidate regions.

4. The performance recording method according to claim 3,
wherein the determining of the plurality of candidate regions includes:
estimating, based on first audio obtained by receiving sounds produced in the first playing, an area in the target capture area in which the musical instrument is represented; and
determining, based on the area in the target capture area in which the musical instrument is represented, at least one of the plurality of candidate regions.

5. The performance recording method according to claim 2, wherein the determining of the plurality of candidate regions includes determining, based on a user-set image area in the first captured imagery, at least one of the plurality of candidate regions.

6. The performance recording method according to claim 2, wherein the selecting of the target area includes selecting the target area based on an amount of change in imagery represented in each of the plurality of candidate regions in second captured imagery representative of the plurality of players in the second playing.

7. The performance recording method according to claim 6, wherein the selecting of the target area includes selecting the target area based on an indicator obtained by weighting the amount of change in imagery represented in each of the plurality of candidate regions.

8. The performance recording method according to claim 2, wherein the selecting of the target area includes selecting the target area based on user-selected imagery from among imagery represented in the plurality of candidate regions in second captured imagery representative of the plurality of players in the second playing.

9. The performance recording method according to claim 2, wherein the extracting of the portion corresponding to the target area from the performance record includes extracting the portion corresponding to the target area from the performance record at a point of time dependent on a point of time of the selecting of the target area.

10. The performance recording method according to claim 2, wherein the extracting of the portion corresponding to the target area from the performance record includes extracting the portion corresponding to the target area from the performance record to a rhythm of the sounds produced in the second playing.

11. The performance recording method according to claim 2, wherein the performance record is second captured imagery generated by the camera in capturing the plurality of players in the second playing, and wherein the portion corresponding to the target area is imagery represented in the target area in the second captured imagery.

12. The performance recording method according to claim 2, wherein the performance record is second audio obtained by a microphone receiving the sounds produced in the second playing, and wherein the portion corresponding to the target area is part of the second audio, the part of the second audio being obtained by receiving sounds from the target area.

13. A computer-implemented performance recording method comprising:

determining a plurality of candidate regions in a target capture area of a camera by use of first captured imagery generated by the camera configured to capture a plurality of players in a first playing of a piece of music;

selecting a target area from among the plurality of candidate regions; and extracting, from a performance record, a portion corresponding to the target area, the performance record being obtained by capturing the plurality of players in a second playing of the piece of music or being obtained by receiving sounds produced in the second playing, wherein the selecting of the target area includes selecting the target area based on an amount of change in imagery represented in each of the plurality of candidate regions in second captured imagery representative of the plurality of players in the second playing.

14. The performance recording method according to claim 13, wherein the plurality of players includes a player, and wherein the determining of the plurality of candidate regions includes:

detecting, from the first captured imagery, at least a portion of the player's body and a musical instrument; and determining, based on the at least the portion of the player's body and the musical instrument, at least one of the plurality of candidate regions.

15. The performance recording method according to claim 14, wherein the determining of the plurality of candidate regions includes:

estimating, based on first audio obtained by receiving sounds produced in the first playing, an area in the target capture area in which the musical instrument is represented; and determining, based on the area in the target capture area in which the musical instrument is represented, at least one of the plurality of candidate regions.

16. The performance recording method according to claim 13, wherein the determining of the plurality of candidate regions includes determining, based on a user-set image area in the first captured imagery, at least one of the plurality of candidate regions.

17. The performance recording method according to claim 13, wherein the selecting of the target area includes selecting the target area based on an indicator obtained by weighting the amount of change in imagery represented in each of the plurality of candidate regions.

18. The performance recording method according to claim 13, wherein the selecting of the target area includes selecting the target area based on user-selected imagery from among imagery represented in the plurality of candidate regions in second captured imagery representative of the plurality of players in the second playing.

19. The performance recording method according to claim 13, wherein the extracting of the portion corresponding to the target area from the performance record includes extracting the portion corresponding to the target area from the performance record at a point of time dependent on a point of time of the selecting of the target area.

20. The performance recording method according to claim 13, wherein the extracting of the portion corresponding to the target area from the performance record includes extracting the portion corresponding to the target area from the performance record to a rhythm of the sounds produced in the second playing.

* * * * *